United States Patent
Okuyama

(10) Patent No.: US 11,734,412 B2
(45) Date of Patent: Aug. 22, 2023

(54) INFORMATION PROCESSING DEVICE

(71) Applicant: NEC CORPORATION, Tokyo (JP)

(72) Inventor: Takuro Okuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 220 days.

(21) Appl. No.: 16/686,342

(22) Filed: Nov. 18, 2019

(65) Prior Publication Data

US 2020/0159908 A1     May 21, 2020

(30) Foreign Application Priority Data

Nov. 21, 2018   (JP) ................................. 2018-218473

(51) Int. Cl.
*G06F 21/45* (2013.01)

(52) U.S. Cl.
CPC ................... *G06F 21/45* (2013.01)

(58) Field of Classification Search
CPC ... H04L 9/3218; H04L 9/0872; H04L 9/3213; G06F 21/45; G06F 21/31; G06F 21/32
See application file for complete search history.

(56) References Cited

U.S. PATENT DOCUMENTS

| 8,127,989 | B2* | 3/2012 | Choi ..................... | G07C 9/27 235/382 |
| 9,142,070 | B2* | 9/2015 | Hanna .................... | G07C 9/37 |
| 11,048,794 | B1* | 6/2021 | Bordow ................ | H04W 12/06 |
| 11,048,956 | B2* | 6/2021 | Lupowitz ............... | G06F 21/32 |
| 2003/0048926 | A1* | 3/2003 | Watanabe .............. | G06V 40/10 382/103 |
| 2012/0216420 | A1* | 8/2012 | McMahon .............. | F26B 3/32 34/487 |
| 2012/0268241 | A1* | 10/2012 | Hanna .................... | G06F 21/32 340/5.52 |
| 2016/0275518 | A1* | 9/2016 | Bowles .................. | G07F 7/06 |
| 2016/0350587 | A1* | 12/2016 | Bataller ................. | H04N 7/18 |
| 2017/0351907 | A1* | 12/2017 | Bataller ................. | G06K 9/6255 |
| 2018/0046790 | A1* | 2/2018 | Jones .................... | G06V 40/20 |
| 2018/0047227 | A1* | 2/2018 | Beavers ................. | G06F 21/40 |

(Continued)

FOREIGN PATENT DOCUMENTS

| JP | 2003-87771 A | 3/2003 |
| JP | 2007-280083 A | 10/2007 |

(Continued)

OTHER PUBLICATIONS

Communication dated Nov. 26, 2019 from Japanese Patent Office in counterpart JP Application No. 2018-218473.

*Primary Examiner* — Tongoc Tran
(74) *Attorney, Agent, or Firm* — Sughrue Mion, PLLC

(57) ABSTRACT

An information processing device according to the present invention includes a first acquiring unit configured to acquire first authentication information of a person, a tracking unit configured to track a person from whom the first authentication information has been acquired based on a captured image captured by an image capturing device, a second acquiring unit configured to acquire second authentication information of a person in a predetermined place, and an associating unit configured to associate the first authentication information and the second authentication information of the same person based on the result of tracking a person.

5 Claims, 20 Drawing Sheets

(56) References Cited

U.S. PATENT DOCUMENTS

| | | | | |
|---|---|---|---|---|
| 2018/0201225 A1* | 7/2018 | Farges | ................... | H04W 12/08 |
| 2019/0130083 A1* | 5/2019 | Agassy | ............... | G06V 40/1347 |
| 2019/0294772 A1* | 9/2019 | Takagi | .................... | H04L 51/08 |
| 2019/0311104 A1* | 10/2019 | Maeno | ................ | G06F 16/5854 |
| 2020/0104577 A1* | 4/2020 | Uchida | ................. | G06V 40/172 |
| 2021/0049392 A1* | 2/2021 | Juncker | .................. | G06V 40/67 |
| 2021/0141878 A1* | 5/2021 | Zhou | .................... | G06V 10/993 |

FOREIGN PATENT DOCUMENTS

| | | |
|---|---|---|
| JP | 2007-303239 A | 11/2007 |
| JP | 2009-151711 A | 7/2009 |
| JP | 2013-69155 A | 4/2013 |
| JP | 2015-176220 A | 10/2015 |
| WO | 2018/110012 A1 | 6/2018 |

\* cited by examiner

Fig.12

STATE TRANSITION OF PERSON P1

| TIME | GAIT AUTHENTICATION | FACE AUTHENTICATION | SETTLEMENT AVAILABILITY |
|---|---|---|---|
| t1 | AA BB | Not Ready | NO |
| t2 | AA BB | Ready | NO |
| t3 | AA BB | AA BB | YES |

INFORMATION PROCESSING DEVICE

INCORPORATION BY REFERENCE

This application is based upon and claims the benefit of priority from Japanese patent application No. 2018-218473, filed on Nov. 21, 2018, the disclosure of which is incorporated herein in its entirety by reference.

TECHNICAL FIELD

The present invention relates to an information processing device in which information necessary for person authentication is registered, an information processing method, and a non-transitory computer-readable medium storing a program.

BACKGROUND ART

As a means for restricting and managing a person entering and leaving a specific place such as an office and an event venue, an authentication system that performs authentication by checking whether a person who intends to pass is a person registered beforehand is used. For example, with the development of human face authentication technology, at a gate installed at the entrance of a specific place, a walk-through face authentication system that performs face authentication based on a face image of a person captured with a camera installed at the gate is used. An authentication system using face authentication is not limited to being used in authentication of a person when the person enters and leaves a specific place, and is also used in a scene of specifying an individual, such as when making an electronic payment.

An authentication system may perform not only face authentication but also authentication using other biometric information, such as fingerprint authentication and iris authentication. Moreover, there is a two-factor authentication system that performs authentication of two factors in combination in order to further increase security. For example, Patent Document 1 describes combination of face authentication with the result of recognition of an IC tag.
Patent Document 1: Japanese Unexamined Patent Application Publication No. JP-A 2015-176220
Patent Document 2: Japanese Unexamined Patent Application Publication No. JP-A 2009-151711

When using the two-factor authentication system described above, it is necessary to associate and register two pieces of authentication information of the same person. However, there is a problem that it takes time to associate two pieces of authentication information. Moreover, Patent Document 2 describes, instead of using the two-factor authentication system, associating biometric information and face information with a registrant ID so as to correspond to different authentication devices that use different factors. In this case, however, it also takes time to associate two pieces of authentication information.

SUMMARY OF THE INVENTION

Accordingly, an object of the present invention is to solve the abovementioned problem that it takes time to associate multiple pieces of authentication information.

An information processing device according to an example aspect of the present invention includes at least one memory storing instructions and at least one processor coupled to the at least one memory. The at least one processor executes the instructions to: acquire first authentication information of a person; track a person from whom the first authentication information has been acquired, based on a captured image captured by an image capturing device; acquire second authentication information of a person in a predetermined place; and based on a result of tracking a person, associate the first authentication information and the second authentication information of a same person.

A non-transitory computer-readable medium storing a program according to another example aspect of the present invention includes instructions for causing at least one processor included by an information processing device to realize execution of processes to: acquire first authentication information of a person; track a person from whom the first authentication information has been acquired, based on a captured image captured by an image capturing device; acquire second authentication information of a person in a predetermined place; and based on a result of tracking a person, associate the first authentication information and the second authentication information of a same person.

An information processing method according to another example aspect of the present invention is an information processing method executed by at least one processor included by an information processing device. The at least one processor executes processes to: acquire first authentication information of a person, and track a person from whom the first authentication information has been acquired, based on a captured image captured by an image capturing device; acquire second authentication information of a person in a predetermined place; and based on a result of tracking a person associate the first authentication information and the second authentication information of a same person.

With the configurations described above, the present invention allows for easily associating multiple pieces of authentication information.

BRIEF DESCRIPTION OF DRAWINGS

FIG. 12 is a view showing an example of information stored in the authentication system disclosed in FIG. 11;

EXAMPLE EMBODIMENT

First Example Embodiment

Figure 1:
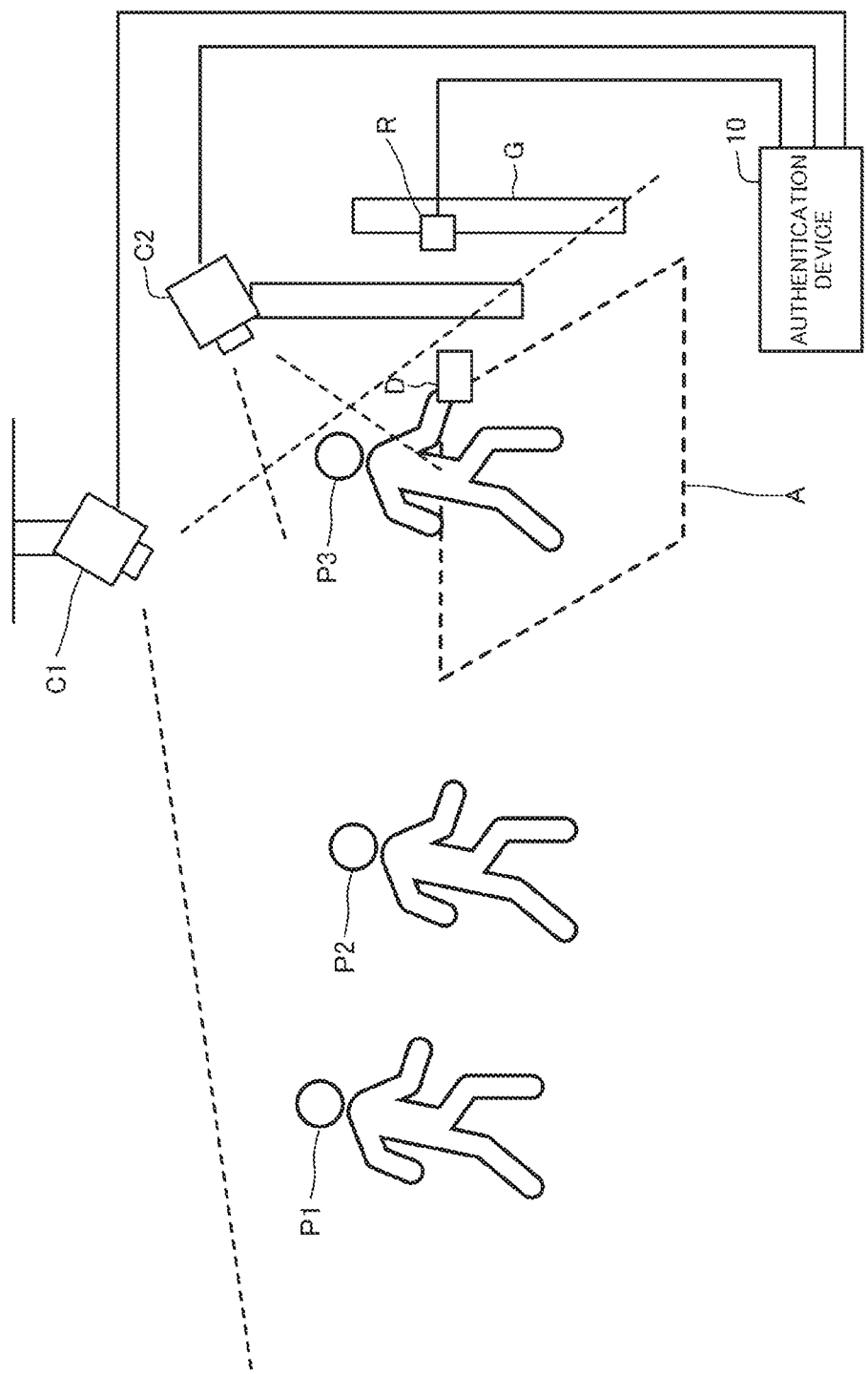
FIG. 1 is a view showing an overall structure of an authentication system in a first example embodiment of the present invention.
Figure 2:
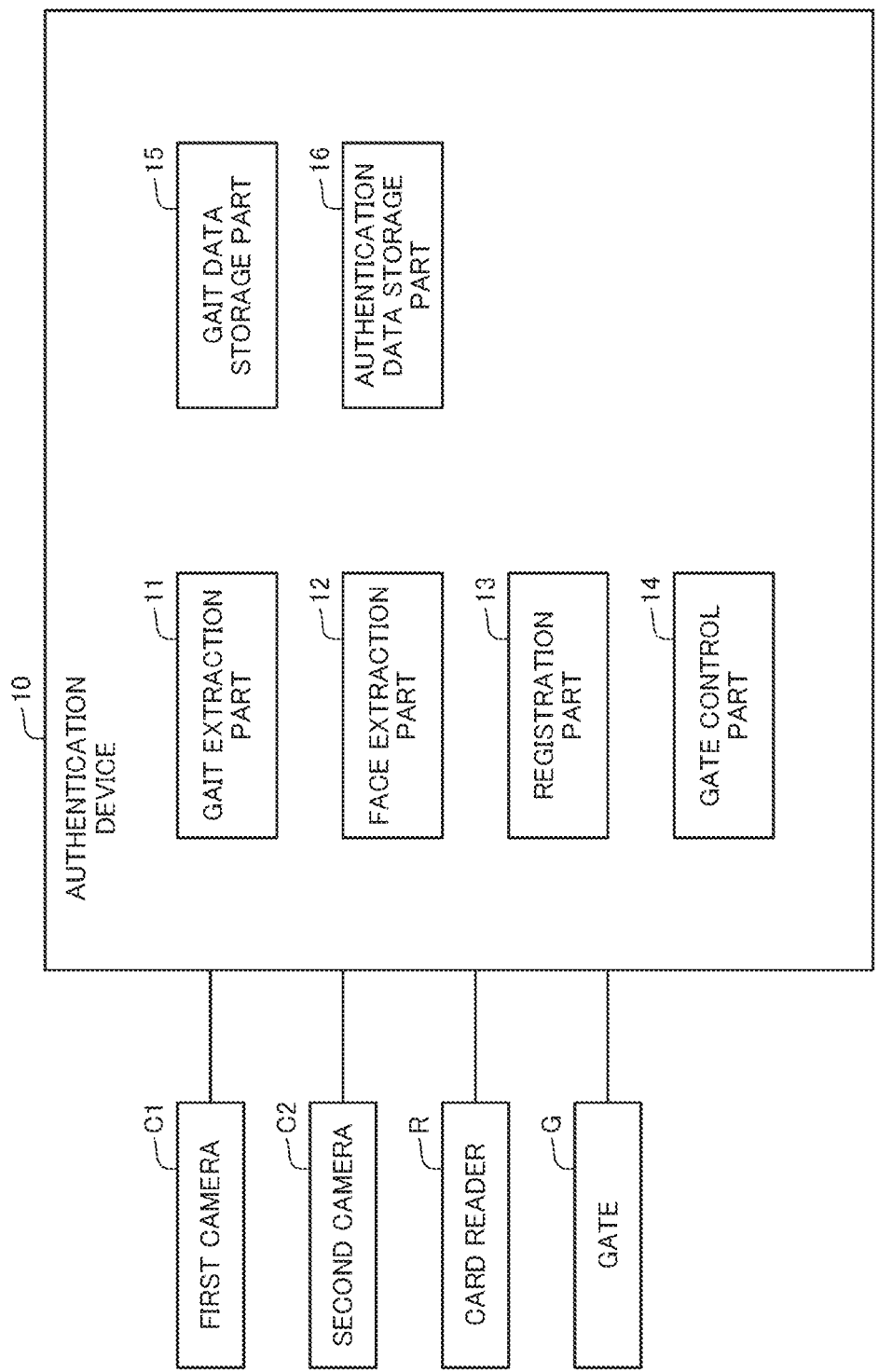
FIG. 2 is a block diagram showing a configuration of an authentication device disclosed in FIG. 1.

A first example embodiment of the present invention will be described with reference to FIGS. 1 to 10. FIGS. 1 and 2 are views for describing the configuration of an authentication system. FIGS. 3 to 10 are views for describing the processing operation of the authentication system.

[Configuration]

An authentication system (an information processing system) according to the present invention is a system that performs person authentication in order to limit entry and exit of a person or identify a person at a specific place such as an office, an event venue, and a shop. The authentication system according to the present invention performs so-called two-factor authentication; for example, it performs gait authentication and face authentication of a person. However, two-factor authentication by the authentication system is not necessarily limited to gait authentication or face authentication, and may be performed by using any two pieces of authentication information as long as they can be acquired from a person.

To be specific, the authentication system in this example embodiment is a system that authenticates a person at a gate G for limiting entry and exit of a person at a specific place. Therefore, as shown in FIG. 1, the authentication system includes a first camera C1 that captures an image of a person heading for the gate G, a second camera C2 installed at the gate G, a card reader R installed at the gate G, and an authentication device 10 that performs person authentication and controls opening and closing of the gate G. However, the authentication system according to the present invention is not necessarily limited to being used for authentication of a person at the gate G for limiting entry and exit of a person, and may perform person authentication at any place. Below, the respective components will be described in detail.

Although not shown, the gate G includes an opening/closing bar that is controlled to be unopened when passage of a person is denied and opened when allowed. As shown in FIG. 1, an area located immediately before the gate G is set as a face authentication area A for capturing a face image of a person P3 as will be described later.

The first camera C1 (an image capturing device) is an image capturing device for capturing an image of the walking motions of persons P1, P2, and P3 walking toward the gate G. For this reason, as shown in FIG. 1, the first camera C1 is installed so as to set a space where the persons P1, P2, and P3 heading for the gate G may walk, such as a walking path to the gate G, as an image capturing range and so as to be able to capture an image of the whole bodies of the persons P1, P2, and P3. For example, the first camera C1 is installed on the ceiling of a space where the gate G is installed. The image capturing range of the first camera C1 also includes the face authentication area A located immediately before the gate G. However, the first camera C1 may be installed at any place.

The second camera C2 (an acquisition device) is an image capturing device that is installed at the gate G and captures a face image of the person P3 who is in the face authentication area A located immediately before the gate G. For this reason, as shown in FIG. 1, the second camera C2 is installed so as to be able to capture an image of the upper body including the face portion of the person P3 who is in the face authentication area A. Moreover, the second camera C2 includes a display part that displays the captured face image and displays an authentication result representing whether or not to allow for passing through the gate G. However, the second camera C2 may be installed at any place, and may not necessarily include the display part.

The card reader R reads person identification information that identifies the person P3 stored in a card D presented by the person P3 who is in the face authentication area A. For example, the card reader R reads person identification information stored in the card D by near-field communication such as RFID (Radio Frequency Identifier).

The authentication device 10 (an information processing device) is formed by one or more information processing devices each including an arithmetic logic unit and a storage unit. As shown in FIG. 1, the authentication device 10 has wired or wireless connection to the gate G, the first camera C1, the second camera C2, and the card reader R, and is installed within a facility where the gate G is installed or at a place that is different from the facility.

As shown in FIG. 2, the authentication device 10 includes a gait extraction part 11, a face extraction part 12, a registration part 13, and a gate control part 14 that are constructed by execution of a program by the arithmetic logic unit. Moreover, the authentication device 10 includes a gait data storage part 15 and an authentication data storage part 16 that are constructed in the storage unit.

The gait extraction part 11 (a first acquisition unit, a tracking unit) acquires a captured image captured by the first camera C1 described above. Then, the gait extraction part 11 first extracts the persons P1, P2, and P3 who are in the captured image and extracts gait data (first authentication information) representing the features of the walking motions of the persons P1, P2, and P3. For example, the gait extraction part 11 extracts a moving object itself within the captured image as a person, or determines and extracts a person based on the shape, color or the like of the moving object. Then, for example, based on the features of the extracted person such as the walking silhouette, head position, and height of the extracted person, the gait extraction part 11 extracts the feature value of the walking motion and uses the feature value as gait data. Because gait data extraction and authentication to be described later can be realized by an existing technique, a detailed description thereof will be omitted.

Further, the gait extraction part 11 tracks the extracted persons P1, P2, and P3 within the captured image, assigns identification information to each of the persons P1, P2, and P3, associates the gait data extracted from the person with the identification information assigned to the person, and stores into the gait data storage part 15. For example, as shown in FIG. 1, when extracting gait data of a plurality of persons P1, P2, and P3 within the captured image, the gait extraction part 11 assigns identification information to each of the persons P1, P2, and P3, associates the gait data extracted from each of the persons P1, P2, and P3 with the identification information of the person, and stores into the gait data storage part 15.

Further, the gait extraction part 11 checks whether or not the person P1, P2, P3 tracked within the captured image is located in the face authentication area A (a predetermined place) and, when detecting that the person P1, P2, P3 is located in the face authentication area A, transmits the gait data extracted from the person P1, P2, P3 to the face extraction part 12. For example, when detecting that the person P3 is located in the face authentication area A as shown in FIG. 1, the gait extraction part 11 retrieves stored gait data stored so as to be associated with the identification information of the person P3 from the gait data storage part 15 and transmits to the face extraction part 12.

The face extraction part 12 (a second acquisition part) acquires a captured image captured by the second camera C2 installed at the gate G described above. The captured image captured by the second camera C2 is an image in which the upper body including the face portion of the person P1 located in the face authentication area A is captured, and the face extraction part 12 extracts a face image from the captured image. For example, the face extraction part 12 extracts a face image based on the color, shape and so on of an object within the captured image. Then, the face extraction part 12 extracts face data (second authentication information) representing the feature value of a face from the extracted face image. For example, the face extraction part 12 extracts and acquires face data representing the feature value of a face from the face image based on the shape of the face, the positions of the respective parts forming the face, and so on.

Then, the face extraction part 12 associates the face data acquired as described above with the gait data notified by the gait extraction part 11 at a timing when the person gets located in the face authentication area A. That is, when the person P3 gets located in the face authentication area A as shown in FIG. 1, the face extraction part 12 almost simultaneously acquires the face data of the person P3 and the gait data of the person P3 already extracted by the gait extraction part 11, and acquires and associates both the data as gait data and face data of the person P3.

Figure 4:
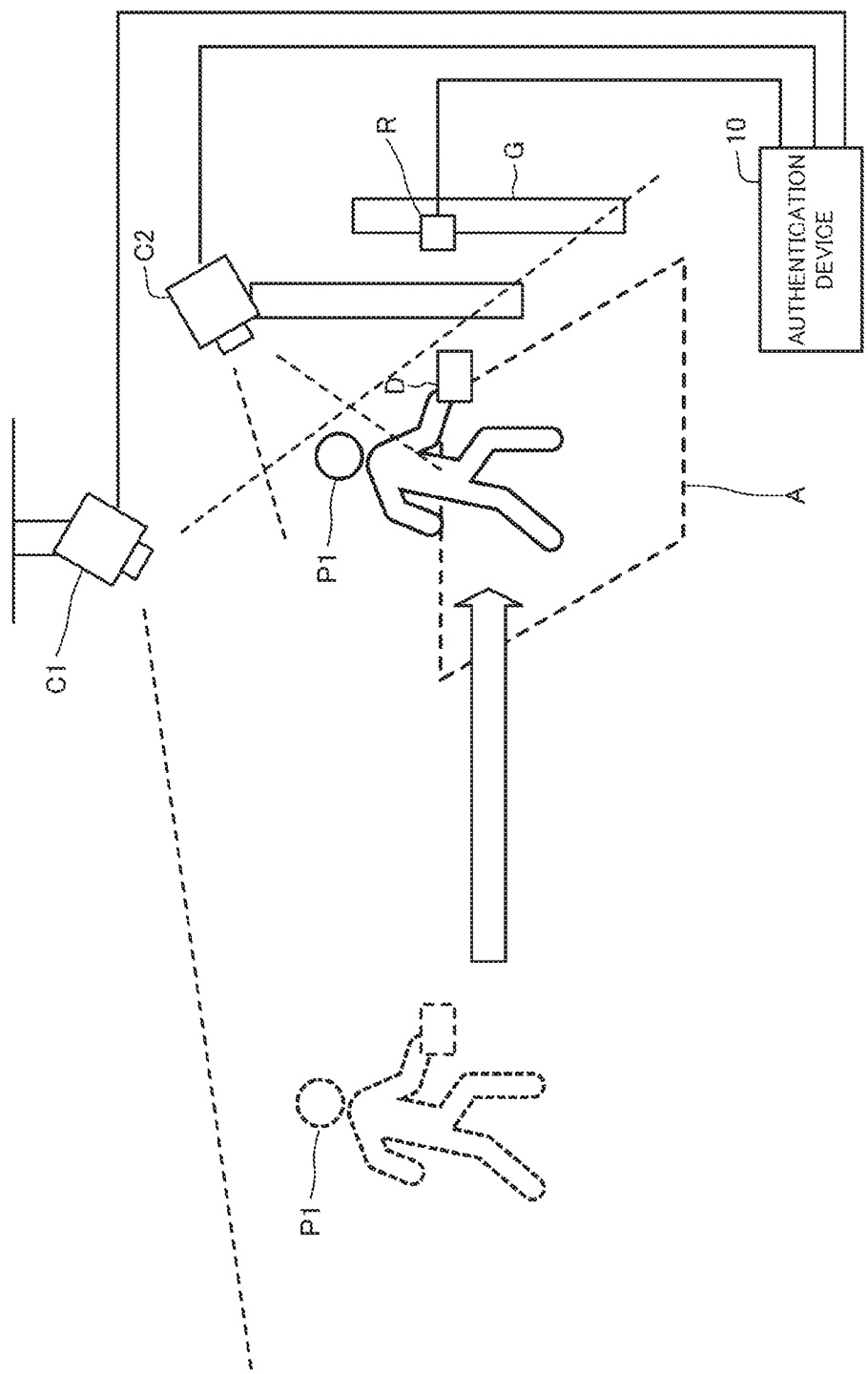
FIG. 4 is a view showing how authentication information is registered by the authentication system disclosed in FIG. 1.

Further, when acquiring gait data and face data because a person gets located in the face authentication area A, the face extraction part 12 checks whether or not person identification information has been read from the card D by the card reader R and the person identification information has been notified by the card reader R. This is for detecting an operation of holding the owned card D over the card reader R in a case where the person P1 gets located in the face authentication area A and performs authentication registration for the first time as shown in FIG. 4 to be described later.

For this reason, in a case where person identification information has been notified almost simultaneously with acquisition of the face data, the face extraction part 12 acquires the notified person identification information as person identification information of the person from whom the face data has been acquired, and further associates the gait data and the face data acquired at almost the same timing with the person identification information, and transmits to the registration part 13. Thus, a registration process by the registration part 13 is performed.

Figure 8:
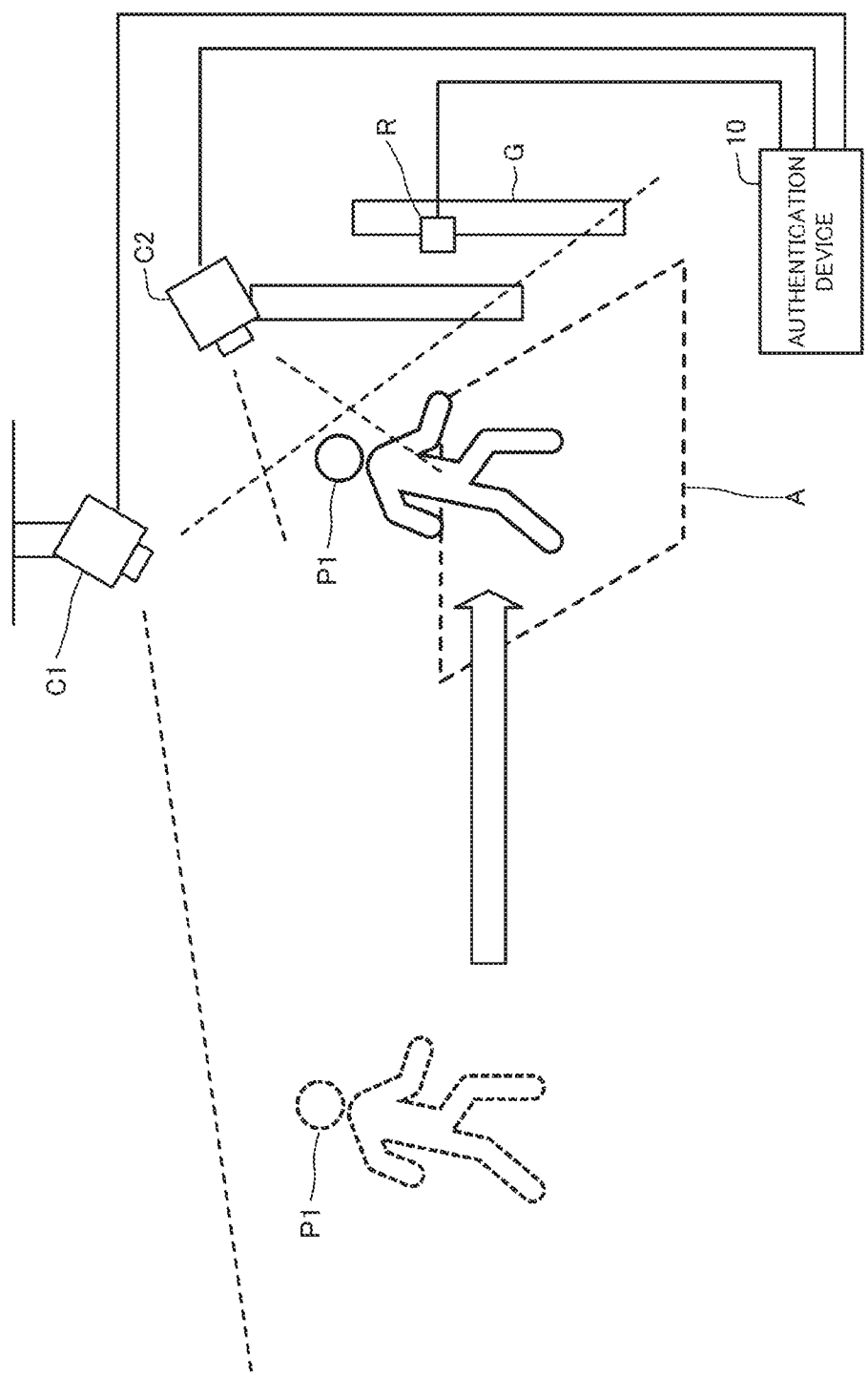
FIG. 8 is a view showing how authentication is performed by the authentication system disclosed in FIG. 1.

On the other hand, in a case where, when the face extraction part 12 acquires the gait data and the face data because the person gets located in the face authentication area A, person identification information is not read by the card reader R and the person identification information is not notified, the face extraction part 12 proceeds to an authentication process. This is because, as shown in FIG. 8 to be described later, in a case where authentication registration has already been performed and an authentication process is performed when the person P1 gets located in the face authentication area A, the operation of holding the card D over the card reader R is not performed. For this reason, in a case where person identification information is not notified almost simultaneously with acquisition of face data, the face extraction part 12 transmits the acquired and associated gait data and face data to the gate control part 14. Thus, the authentication process by the gate control part 14 is performed.

The registration part 13 (an associating unit) performs the registration process of acquiring person identification information, gait data, and face data that are transmitted from the face extraction part 12, associating them as authentication information of the same person, and registering into the authentication data storage part 16. With this, for example, as for the person P1 shown in FIG. 3, gait data is acquired before the person P1 reaches the gate G. Then, as shown in FIG. 4, the person P1 is tracked until getting located in the face authentication area A before the gate G, and face data of the person P1 is acquired in the face authentication area A. With this, it is possible to automatically register gait data and face data of the same person as a set of authentication information.

However, when registering gait data and face data of a person, the registration part 13 performs authentication of person identification information read from the card D, acquired almost simultaneously with the gait data and the face data. In a case where the person identification is registered beforehand and the authentication has succeeded, the registration part 13 registers the gait data and the face data of the person as a set of authentication information. That is, in a case where person identification information stored in the card D is registered as information of a person who is allowed to pass through the gate G beforehand, the authentication of this person succeeds and a set of authentication information is thereby automatically registered. In a case where authentication of person identification information succeeds, the registration part 13 notifies it to the gate control part 14.

The gate control part 14 (a collating unit) judges that authentication of a person has succeeded when notified by the registration part 13 that authentication of person identification information has succeeded. Then, the gate control part 14 causes the display part included by the second camera C2 to display that the authentication succeeded and also controls the gate G to open to allow the person to pass through.

Further, in a case where person identification information of a person is not input from the card D and an authentication information set including gait data and face data is transmitted from the face extraction part 12, the gate control part 14 performs the authentication process. At this time, the gate control part 14 performs collation by checking whether or not gait data and face data corresponding to acquired gait data and face data are associated and stored in the authentication data storage part 16. In a case where the acquired gait data and face data are associated and stored in the authentication data storage part 16, the gate control part 14 judges that authentication of the person is succeeded. After that, the gate control part 14 causes the display part included by the second camera C2 to display that the authentication has succeeded and also controls the gate G to open to allow the person to pass through.

On the other hand, in a case where the acquired gait data and face data are not associated or stored in the authentication data storage part 16, the gate control part 14 judges that authentication of the person has failed. After that, the gate control part 14 causes the display part included by the second camera C2 to display that the authentication has failed and also controls the gate G to be unopened to deny the person from passing through.

In this example embodiment, the gate control part 14 may judge that authentication of a person has succeeded in a case where, although gait data and face data transmitted from the face extraction part 12 are not associated or stored in the authentication data storage part 16, only the face data is registered in the authentication data storage part 16. That is, the gate control part 14 may judge authentication of a person has succeeded in a case where, although collation of the gait data has failed, collation of the face data has succeeded. This is for responding to such a situation that, for example, gait data of a person may have changed from gait data registered in the authentication data storage part 16 due to injury or change in physical condition.

In this case, the gate control part 14 causes the display part included by the second camera C2 to display that the authentication has succeeded and also controls the gate G to open to allow the person to pass through. In addition, the gate control part 14 transmits the acquired gait data and face data to the registration part 13 so that they are reregistered. With this, the registration part 13 retrieves gait data associated with the face data from the authentication data storage part 16, and replaces the retrieved gait data with the transmitted gait data. With this, the new gait data is associated with the already registered face data.

[Operation]

Next, the operation of the authentication system will be described with reference to FIGS. 3 to 10. First, an operation to register authentication information of the person P1 will be described with reference to views showing the motion of the person of FIGS. 3 and 4, the sequence diagram of FIG. 5, and the flowchart of FIG. 6.

Figure 3:
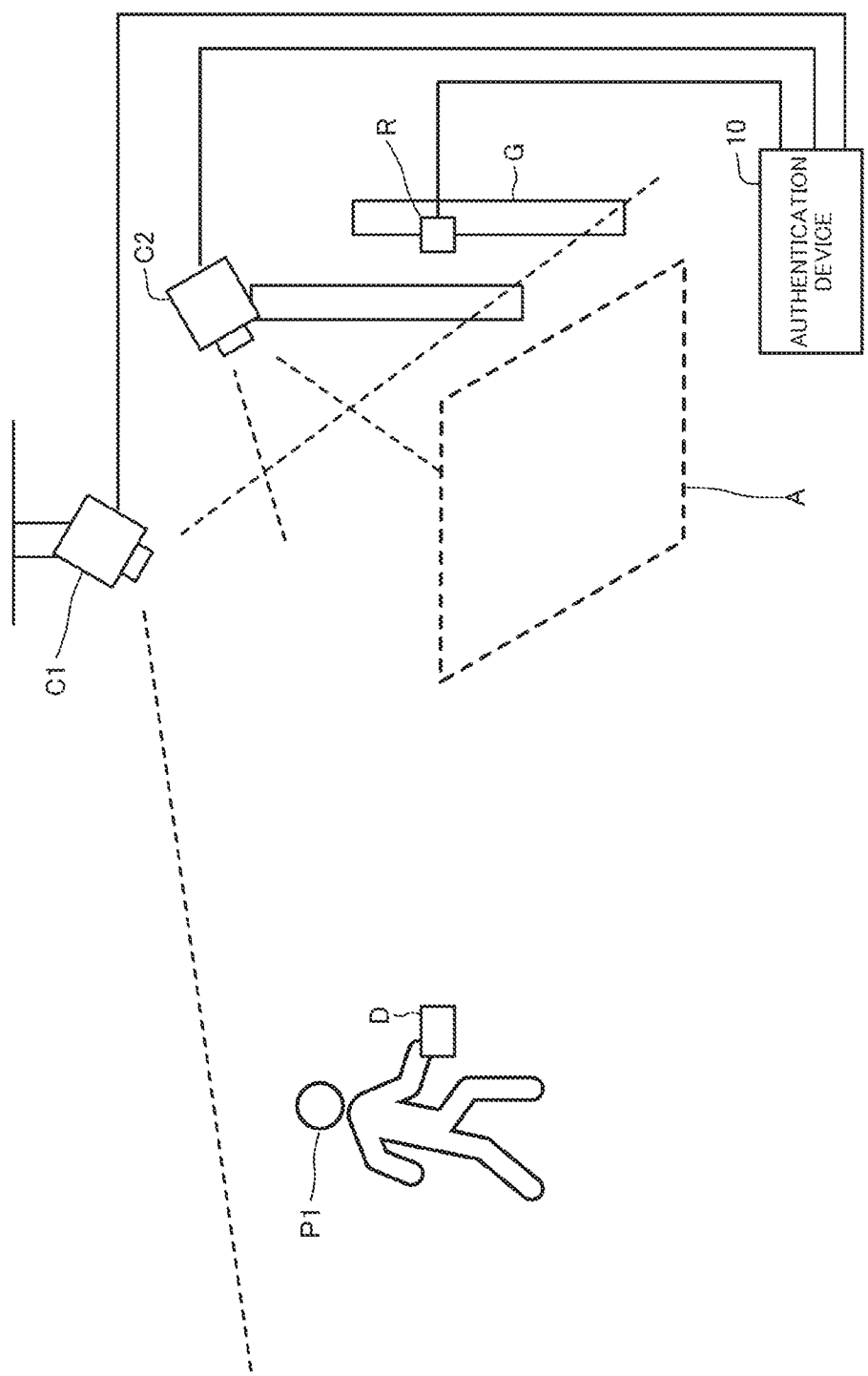
FIG. 3 is a view showing how authentication information is registered by the authentication system disclosed in FIG. 1.

When the person P1 registers authentication information for the first time, the person P1 heads for the gate G with the card D in which person identification information of the person P1 is stored as shown in FIG. 3. At this time, the authentication device 10 acquires a captured image captured by the first camera C1 (step S1 of FIG. 5), and analyzes the captured image. To be specific, the authentication device 10 extracts the person P1 within the captured image, and extracts gait data of the person P1 (step S2 of FIG. 5, step S11 of FIG. 6, a first process). Then, the authentication device 10 assigns identification information to the person P1, associates the gait data with the identification information and stores into the gait data storage part 15, and also tracks the person P1 (step S2 of FIG. 5, step S11 of FIG. 6, the first process).

After that, while the person P1 is moving toward the gate G, the authentication device 10 checks whether or not the person P1 tracked within the captured image is located in the face authentication area A set immediately before the gate G. When detecting that the person P1 is located in the face authentication area A as shown in FIG. 4 (step S3 of FIG. 5, Yes at step S12 of FIG. 6), the authentication device 10 retrieves gait data of the person P1 extracted from the captured image obtained by capturing an image of the person P1 from the gait data storage part 15 (step S4 of FIG. 5, step S13 of FIG. 6). Then, the authentication device 10 acquires a captured image captured by the second camera C2 installed at the gate G (step S5 of FIG. 5). At this time, the captured image captured by the second camera C2 is an image of the upper body including the face portion of the person P1 located in the face authentication area A, and the authentication device 10 extracts a face image from the captured image. Then, the authentication device 10 extracts face data representing the feature value of the face of the person P1 from the extracted face image (step S6 of FIG. 5, step S14 of FIG. 6, a second process). With this, the authentication device 10 can obtain an authentication information set including gait data and face data of the person P1.

The person P1 located in the face authentication area A immediately before the gate G holds the owned card D over the card reader R installed at the gate G in order to register authentication information for the first time. Then, the authentication device 10 acquires person identification information of the person P1 stored in the card D read by the card reader R (step S6 of FIG. 5, Yes at step S15 of FIG. 6). Thus, when acquiring person identification information from the card D almost simultaneously with acquisition of the authentication information set, the authentication device 10 performs the registration process in the following manner.

Figure 5:
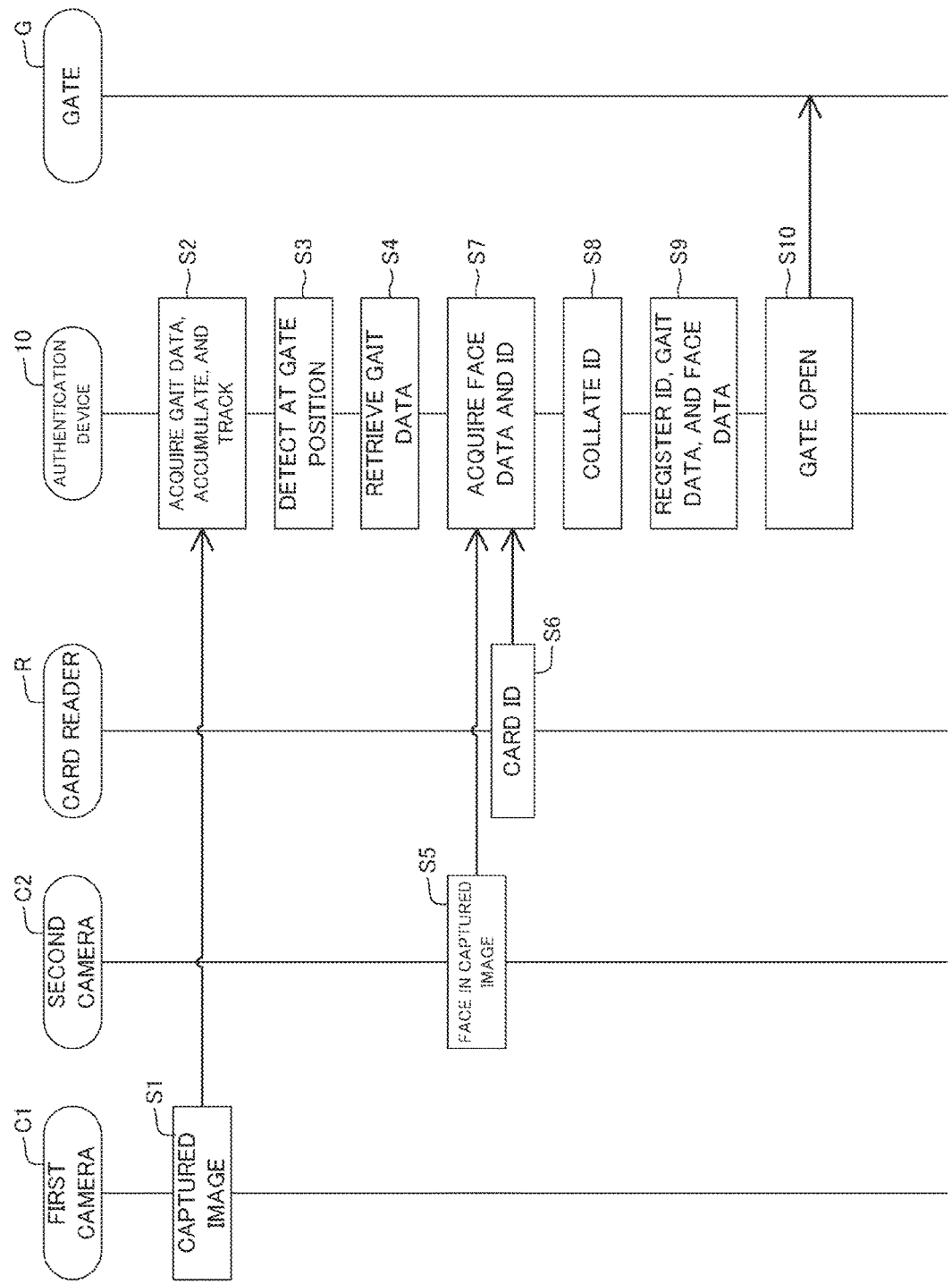
FIG. 5 is a sequence diagram showing an operation when authentication information is registered by the authentication system disclosed in FIG. 1.
Figure 6:
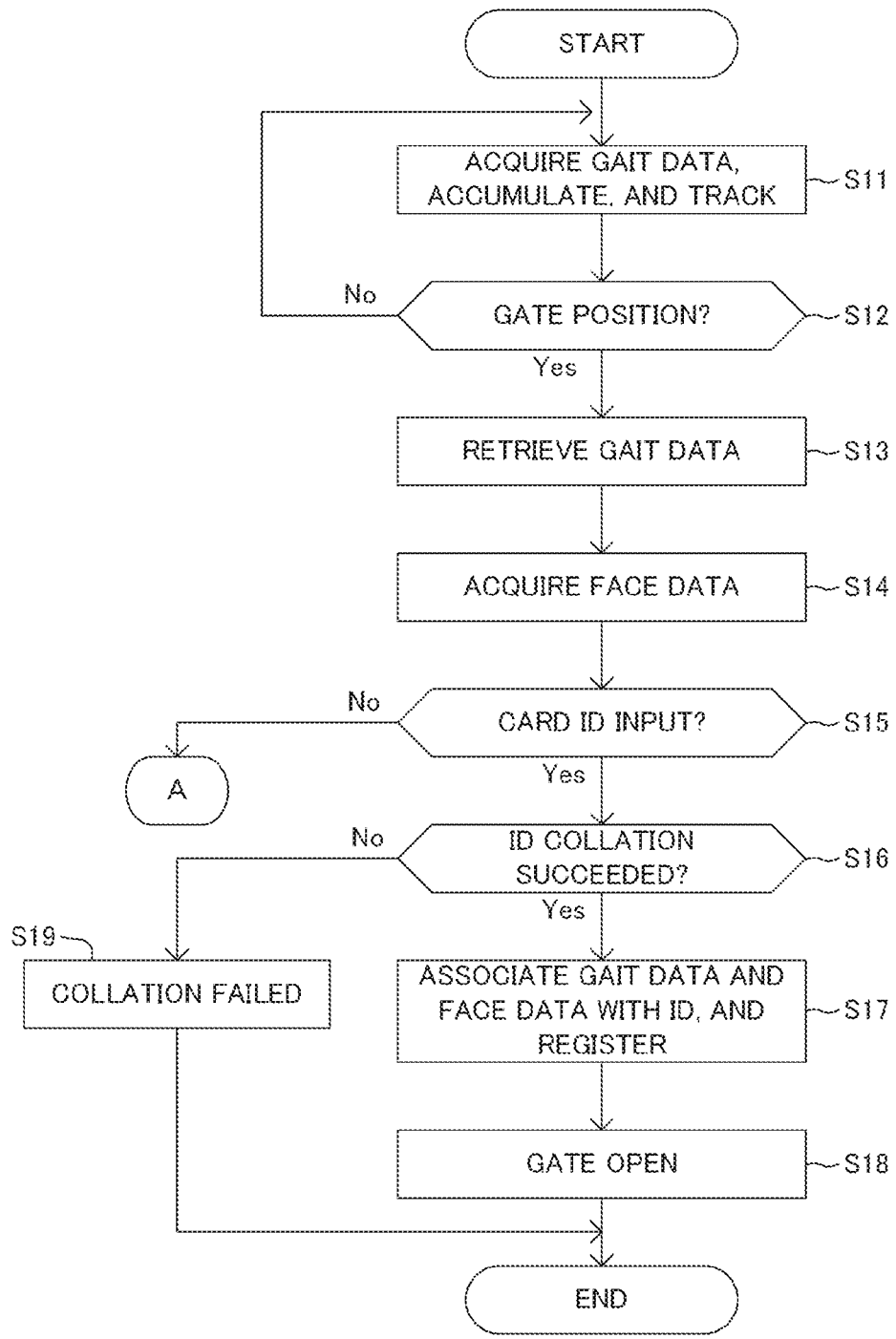
FIG. 6 is a flowchart showing an operation when authentication information is registered by the authentication device disclosed in FIG. 1.

As the registration process, the authentication device 10 first performs collation by checking whether the person identification information is registered beforehand (step S8 of FIG. 5, step S16 of FIG. 6). As a result of the collation, in a case where the acquired person identification information is registered, the authentication device 10 judges that authentication of the person has succeeded (Yes at step S16 of FIG. 6). Then, the authentication device 10 stores and registers the gait data and the face data of the person P1 as an authentication information set into the authentication data storage part 16 (step S9 of FIG. 5, step S17 of FIG. 6, a third process). Moreover, the authentication device 10 controls the gate G to open (step S10 of FIG. 5, step S18 of FIG. 18) to allow the person to pass through.

Meanwhile, in a case where the acquired person identification information is not registered, the authentication device 10 judges that authentication of the person has failed (No at step S16 of FIG. 6). Then, the authentication device 10 does not open the gate G, and denies the person from passing through.

Next, an operation when the person P1 passes through the gate will be described with reference to views showing the motion of a person of FIGS. 7 and 8, a sequence diagram of FIG. 9, and flowcharts of FIGS. 6 and 10.

Figure 7:
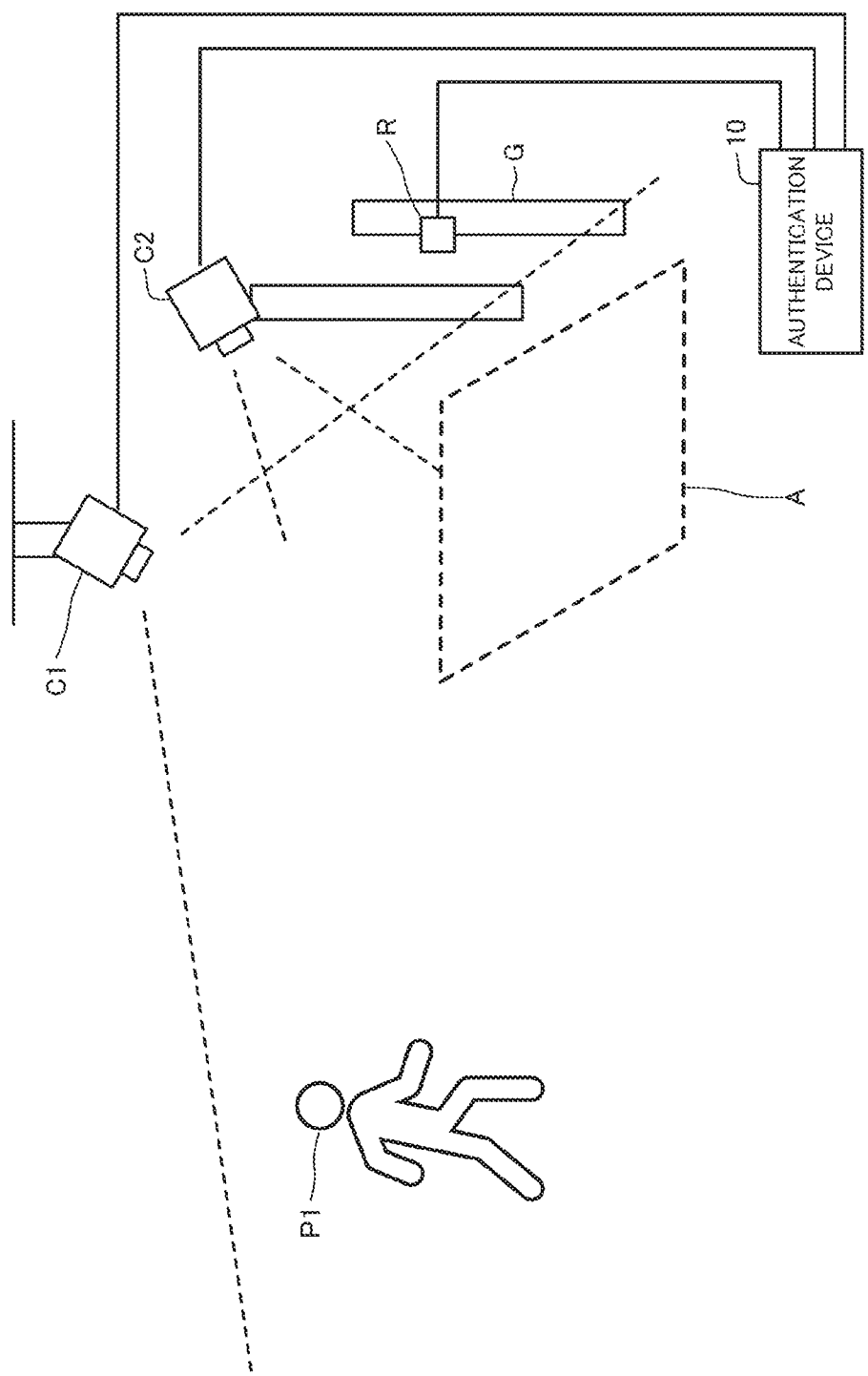
FIG. 7 is a view showing how authentication is performed by the authentication system disclosed in FIG. 1.

When the person P1, whose authentication information has already been registered, intends to pass through the gate G, the person P1 heads for the gate G without holding the card D as shown in FIG. 7. At this time, the authentication device 10 acquires a captured image captured by the first camera C1 (step S22 of FIG. 9), and analyzes the captured image. To be specific, the authentication device 10 extracts the person P1 within the captured image, and extracts the gait of the person P1 (step S12 of FIG. 9, step S11 of FIG. 6). Then, the authentication device 10 assigns identification information to the person P1, associates the gait data with the identification information, and stores them into the gait data storage part 15, and also tracks the person P1 (step S22 of FIG. 9, step S11 of FIG. 6, a fourth process).

After that, while the person P1 is moving toward the gate G, the authentication device 10 checks whether or not the person P1 tracked within the captured image is located in the face authentication area A set immediately before the gate G. When detecting that the person P1 is located in the face authentication area A as shown in FIG. 8 (step S23 of FIG. 9, Yes at step S12 of FIG. 6), the authentication device 10 retrieves, from the gait data storage part 15, the gait data of the person P1 extracted from the captured image obtained by capturing the person P1 (step S24 of FIG. 9, step S13 of FIG. 6). Then, the authentication device 10 acquires a captured image captured by the second camera C2 installed at the gate G (step S25 of FIG. 9). At this time, the captured image captured by the second camera C2 is an image of the upper body including the face portion of the person P1 located in the face authentication area A, and the authentication device 10 extracts a face image from the captured image. Then, the authentication device 10 extracts face data representing the feature value of the face of the person P1 from the extracted face image (step S26 of FIG. 9, step S14 of FIG. 6, a fifth process). With this, the authentication device 10 can acquire an authentication information set including the gait data and the face data of the person P1.

Then, the person P1 located in the face authentication area A immediately before the gate G intends to pass through the gate G and, unlike in the abovementioned case, the person P1 does not hold the card D over the card reader R. The authentication device 10 does not perform acquisition of the person identification information of the person P1 stored in the card D almost simultaneously with acquisition of the authentication information set (No at step S15 of FIG. 6). In this case, the authentication device 10 performs the authentication process in the following manner (continued to the flowchart of FIG. 10).

Figure 9:
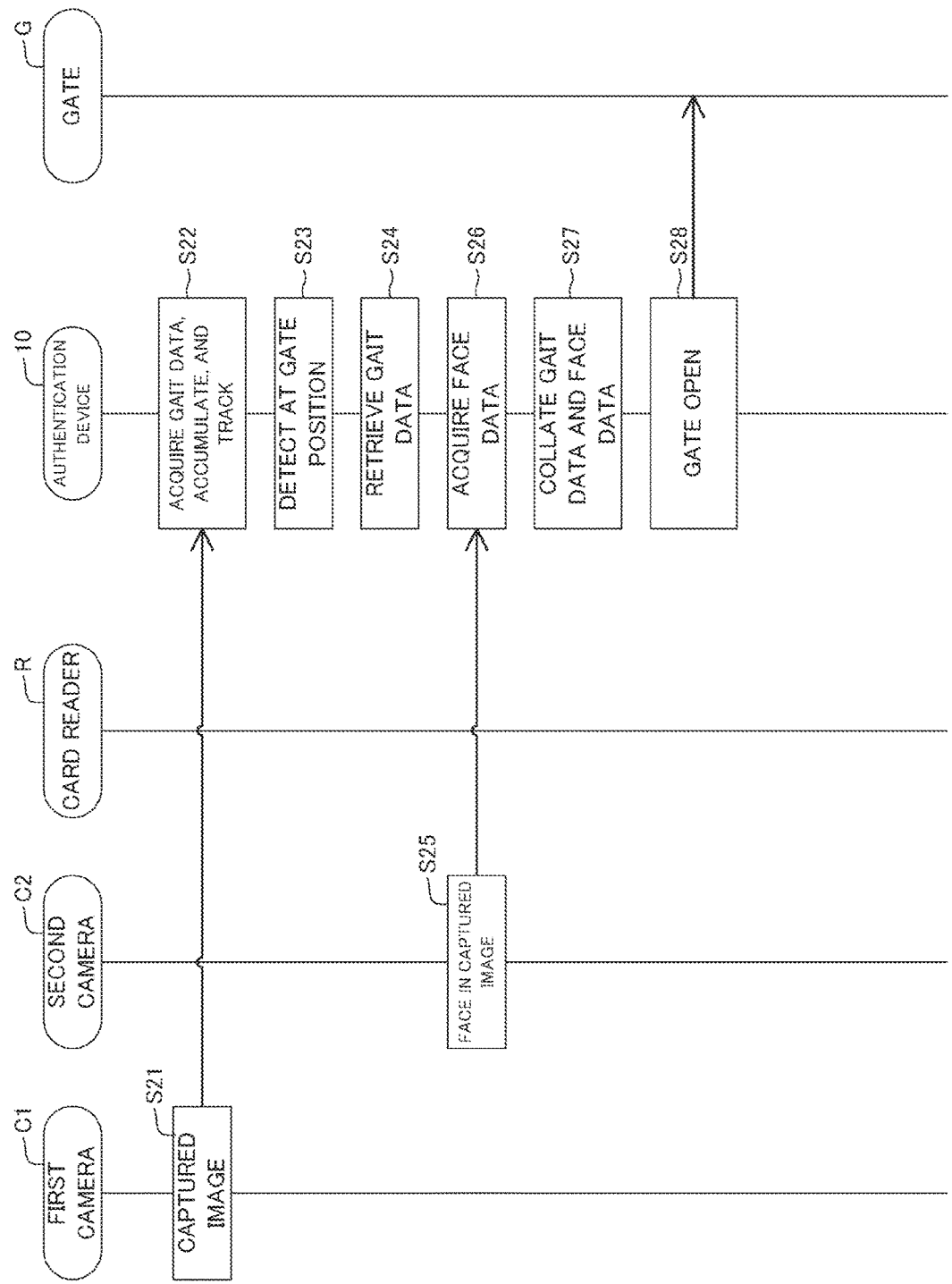
FIG. 9 is a sequence diagram showing an operation when authentication is performed by the authentication system disclosed in FIG. 1.
Figure 10:
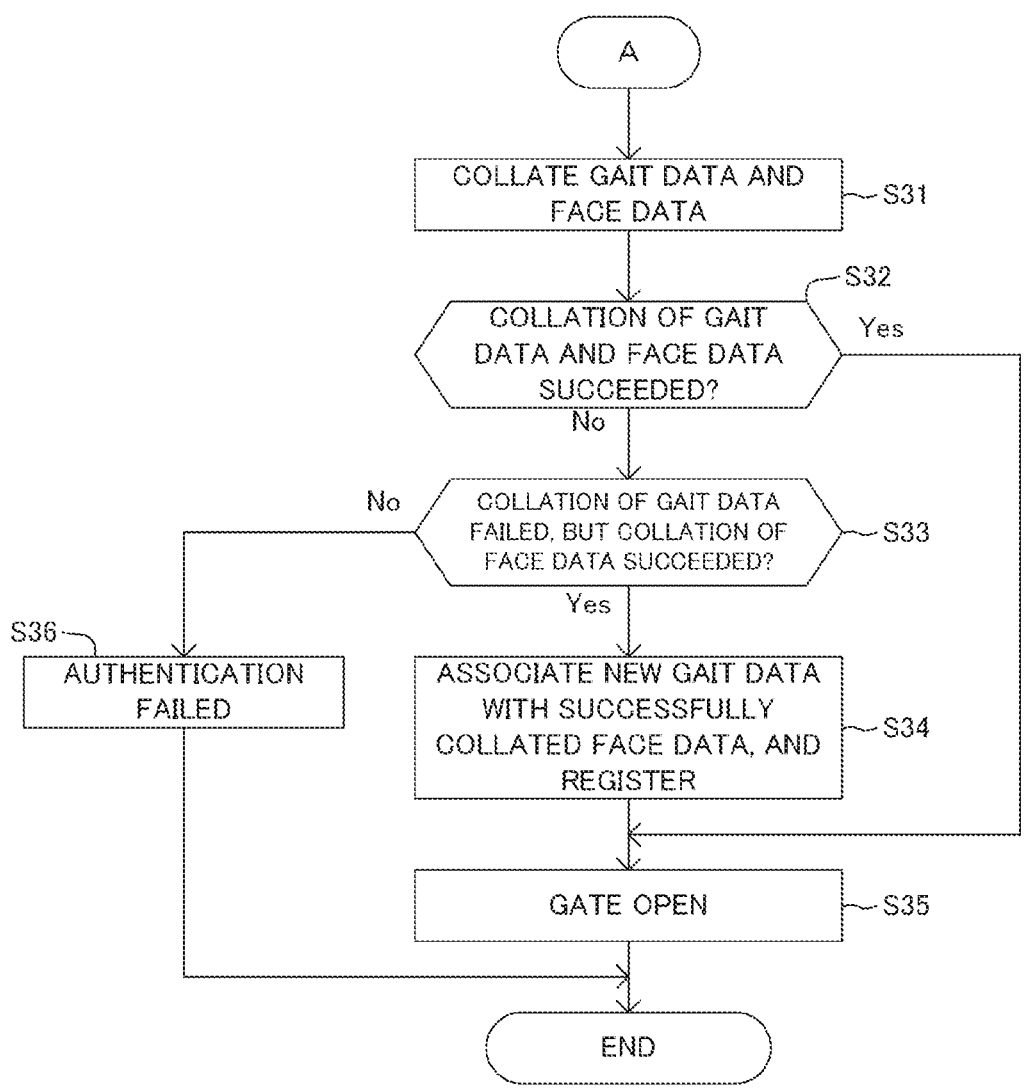
FIG. 10 is a flowchart showing an operation when authentication is performed by the authentication device disclosed in FIG. 1.

As the authentication process, the authentication device 10 performs a collation process to check whether or not the acquired gait data and face data of the person P1 are associated and stored as corresponding gait data and face data in the authentication data storage part 16 (step S27 of FIG. 9, step S31 of FIG. 10, a sixth process). In a case where the acquired gait data and face data of the person P1 are stored in the authentication data storage part 16, the gate control part 14 judges that authentication of the person has succeeded (Yes at step S32 of FIG. 10). After that, the authentication device 10 controls the gate G to open, and allows the person to pass through (step S28 of FIG. 9, step S35 of FIG. 10).

On the other hand, in a case where the collation of the face data of the acquired gait data and the face data has failed (No at step S32 and No at step S33 of FIG. 10), the authentication device 10 judges that authentication of the person P1 has failed (step S36 of FIG. 10). In this case, the authentication device 10 keeps the gate G unopened and denies the person P1 from passing through.

However, in a case where, although collation of the gait data of the acquired gait data and the face data has failed, the collation of the face data has succeeded (Yes at step S33 of FIG. 10), the authentication device 10 judges that authentication of the person P1 has succeeded. In this case, the authentication device 10 associates the newly extracted gait data with the successfully collated face data stored in the authentication data storage part 16, and reregisters into the authentication data storage part 16 (step S34 of FIG. 10). Then, the authentication device 10 controls the gate G to open to allow the person to pass through (step S28 of FIG. 9, step S35 of FIG. 10).

As described above, the authentication system according to the present invention allows two pieces of authentication information including gait data and face data of the same person to be associated and registered automatically when the person passes through the gate G. As a result, an operation to associate authentication information is facilitated, and a two-factor authentication system can be easily used. Moreover, even if gait data that is one of the authentication information changes, it is possible to automatically reregister gait data, so that use of a two-factor authentication system is further facilitated.

In the above description, when two pieces of authentication information including gait data and face data are associated, person identification information of the person P1 stored in the card D is used, but it is not necessarily required to use the person identification information. For example, it is possible to acquire gait data and face data of all persons passing through the gate G in the abovementioned manner and, when such data is not registered as authentication information, register as a set of authentication information of the person.

Further, in the above description, gait data and face data are used as authentication information, but other data may be used. For example, instead of gait data, information representing the features of another moving motion of a person may be used, or information representing the features of the appearance such as the figure of a person may be used. Moreover, for example, instead of face data, other biological information such as a person's iris or fingerprint may be acquired by an acquisition device installed at the gate G, and information that can authenticate another person may be used.

Further, in the above description, when a tracked person gets located at the gate G, the gait data of the person is retrieved from the gait data storage part 15, and the collation of gait data together with the face data acquired at the gate G is performed, but the collation of gait data may be performed while a person is tracked. That is, the authentication device 10 may, before a person gets located at the gate G after extraction of gait data of the person, perform collation by checking whether or not the gate data has already been registered as authentication information. Then, the authentication device 10 may store the result of the collation of the gait data while tracking the person, and perform final authentication together with the result of collation of face data performed when the person gets located at the gate G.

The gait extraction part 11 of the authentication device 10 stores gait data extracted from a captured image captured by the first camera C1 into the gait data storage part 15, but may delete the gait data from the gait data storage part 15 at any timing. For example, the authentication device 10 may delete the gait data at a timing when the tracked person disappears from the captured image captured by the first camera C1 and cannot be tracked any more, or at a timing when the tracked person gets located at the gate G and the gait data of the person is retrieved from the gait data storage part 15. The timing of deleting the gait data may be any timing. For example, the authentication device 10 may delete the gait data that has been stored for a given time after being stored in the gait data storage part 15.

Second Example Embodiment

Figure 11:
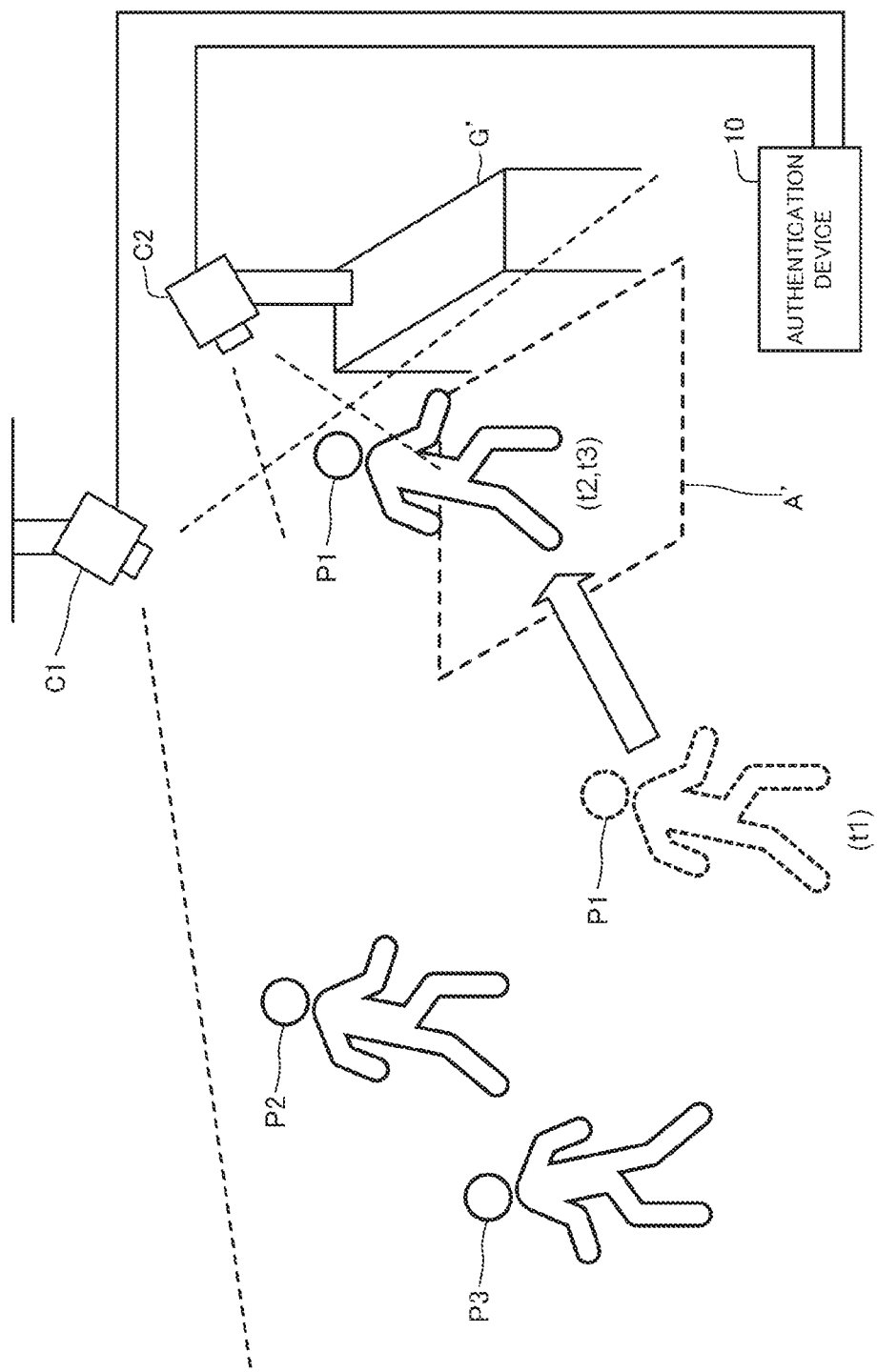
FIG. 11 is a view showing the overall structure of an authentication system according to a second example embodiment of the present invention and how the authentication system is used.

Next, a second example embodiment of the present invention will be described with reference to FIGS. 11 and 12. FIG. 11 is a view for describing the configuration and processing operation of an authentication system, and FIG. 12 is a view showing an example of data processed by an authentication device.

The authentication system in this example embodiment includes almost the same configuration as in the first example embodiment, but a scene to use is different. For example, the authentication system in this example embodiment performs two-factor authentication of a person within a shop and automatically performs a settlement process on a person who is successfully authenticated at a checkout counter.

To be specific, the authentication system in this example embodiment includes the first camera C1 configured to capture an image of a person moving within a shop, the second camera C2 installed at a cash register G', a card reader (not shown) installed at the cash register G', and the authentication device 10 configured to perform a person authentication process and a settlement process for purchase within the shop. Below, an operation to register authentication information and an operation to perform a person authentication process and perform a settlement process by the authentication device 10 will be described along with the motion of a person. A device performing the settlement process and a device performing the person authentication process may be separately provided.

In a case where the person P1 registers authentication information for the first time, the person P1 has a card (not shown) in which person identification information of the person P1 is stored and heads for the cash register G'. For example, the card is a credit card that can be used for settlement. The authentication device 10 acquires a captured image captured by the first camera C1, and extracts gait data of persons within the captured image, that is, gait data of the persons P1, P2, and P3 within the shop. The authentication device 10 assigns identification information to each of the persons P1, P2, and P3, associates the gait data of each of the persons with the identification information of the person and stores, and also tracks each of the persons P1, P2, and P3.

After that, while the persons P1, P2, and P3 within the shop are moving, the authentication device 10 checks whether or not the person P1 tracked within the captured image is located in a face authentication area A' set immediately before the cash register G'. When detecting that the person P1 gets located in the face authentication area A' as shown in FIG. 11, the authentication device 10 retrieves the gait data of the person P1 extracted from the captured image obtained by capturing the image of the person P1 from the gait data storage part 15. The authentication device 10 acquires a captured image captured by the second camera C2 installed at the cash register G'. At this time, the captured image captured by the second camera C2 is an image of the upper body including the face portion of the person P1 located in the face authentication area A', and the authentication device 10 extracts a face image from the captured image. Then, the authentication device 10 extracts face data representing the feature value of the face of the person P1 from the extracted face image. With this, the authentication device 10 can acquire an authentication information set including the gait data and face data of the person P1.

In order to register authentication information for the first time, the person P1 located in the face authentication area A' immediately before the cash register G' hands the owned card to a clerk at the cash register G', or causes the installed card reader R to read the information. The authentication device 10 acquires credit card information that is person identification information of the person P1 stored in the card D read by the card reader R. With this, the authentication device 10 stores and registers the credit card information associated with the gait data and face data of the person P1.

When the person P1 visits the shop at a later date, the authentication device 10 acquires a captured image captured by the first camera C1, and extracts gait data of the person P1. Then, the authentication device 10 assigns identification information to the person P1, associates the gait data with the identification information, and stores into the gait data storage part 15, and also tracks the person P1. At this time, the authentication device 10 may perform collation by checking whether or not the acquired gait data is already registered. In this case, when the collation of the gait data has succeeded, the authentication device 10 may store the identification information (AA BB) of the person P1 for whom the collation of the gait data has succeeded onto the memory and wait for face data collation and settlement availability as shown in FIG. 12. For example, in a case where the person P1 is in the state of time t1 in FIG. 11, the authentication device 10 stores data representing a state where the collation of the gait data has merely succeeded onto the memory as shown in FIG. 12.

After that, while the person P1 is moving toward the cash register G', the authentication device 10 checks whether or not the person P1 tracked within the captured image is located in the face authentication area A' set immediately before the cash register G'. As shown in FIG. 12, when detecting that the person P1 gets located in the face authentication area A', the authentication device 10 retrieves face data registered so as to be associated with the gait data extracted from the person P1. Then, the authentication device 10 acquires a captured image captured by the second camera C2 installed at the cash register G', and extracts face data representing the feature value of the face of the person P1 from the face image. The authentication device 10 checks whether or not the acquired face data of the person P1 agrees with the face data registered so as to be associated with the gait data that has already been collated successfully. At this time, on the memory shown in FIG. 12, for the person P1 (AA BB), data representing Ready state representing face authentication is being performed is stored at time t2, and data representing a state where face authentication has succeeded and settlement is available is stored at time t3. With this, the authentication device 10 can perform settlement by using credit card information registered for the person P1 whose authentication has succeeded.

Third Example Embodiment

Figure 13A:
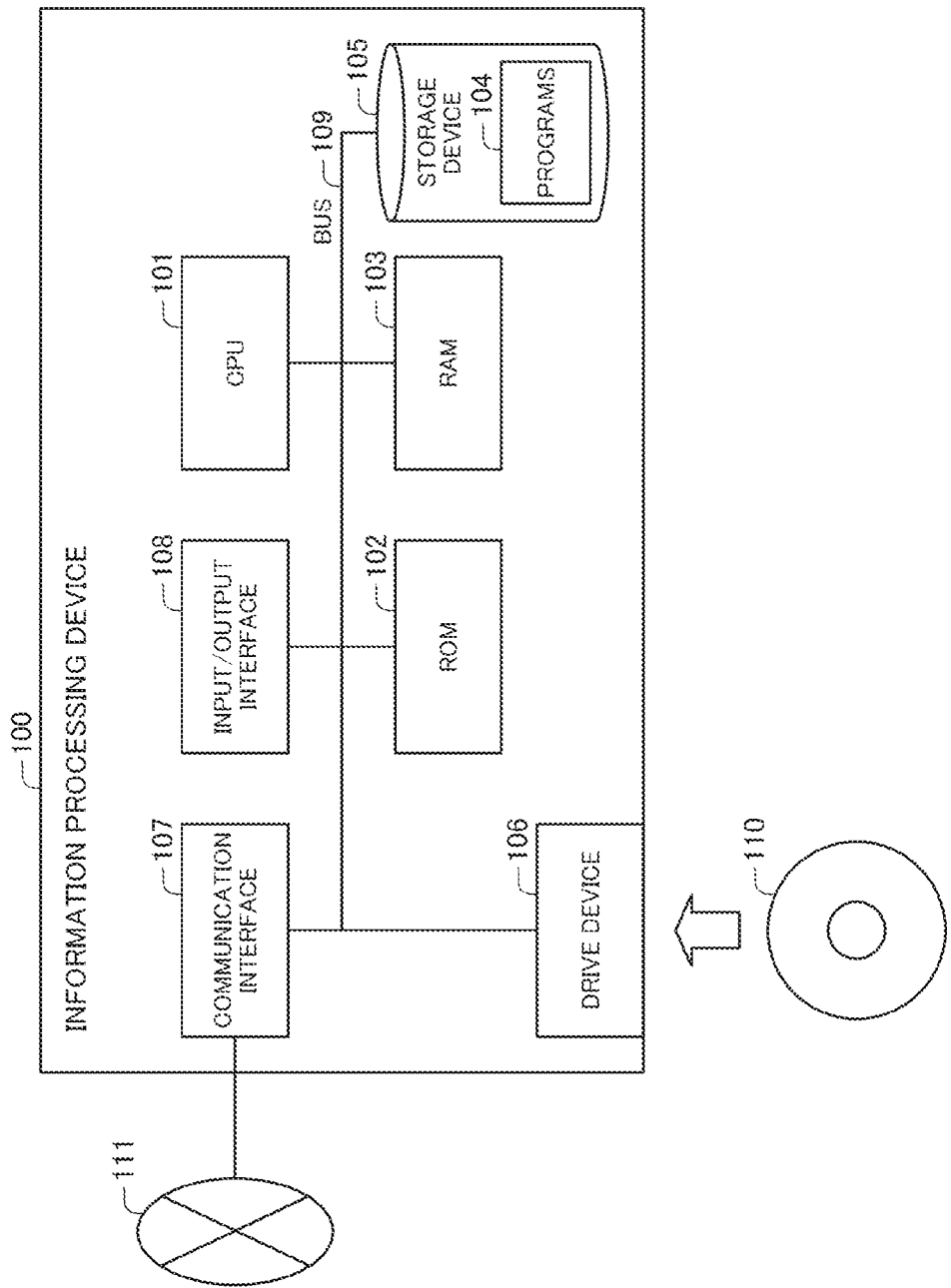
FIG. 13A is a block diagram showing hardware components of an information processing device according to a third example embodiment of the present invention.
Figure 13B:
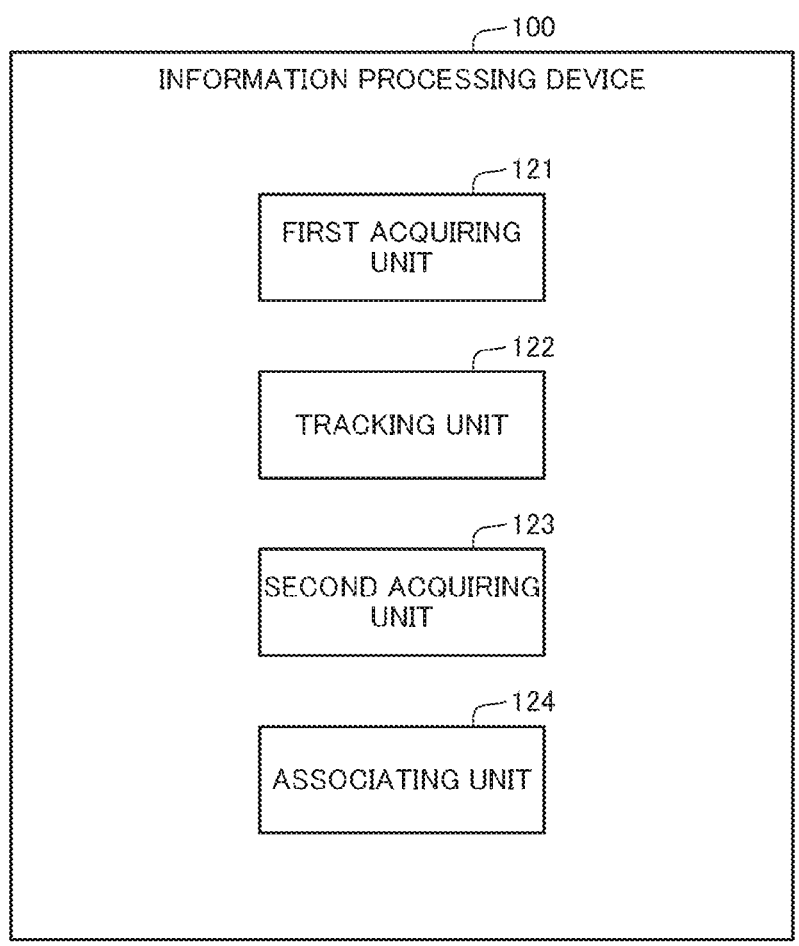
FIG. 13B is a block diagram showing a configuration of the information processing device according to the third example embodiment of the present invention.
Figure 13C:
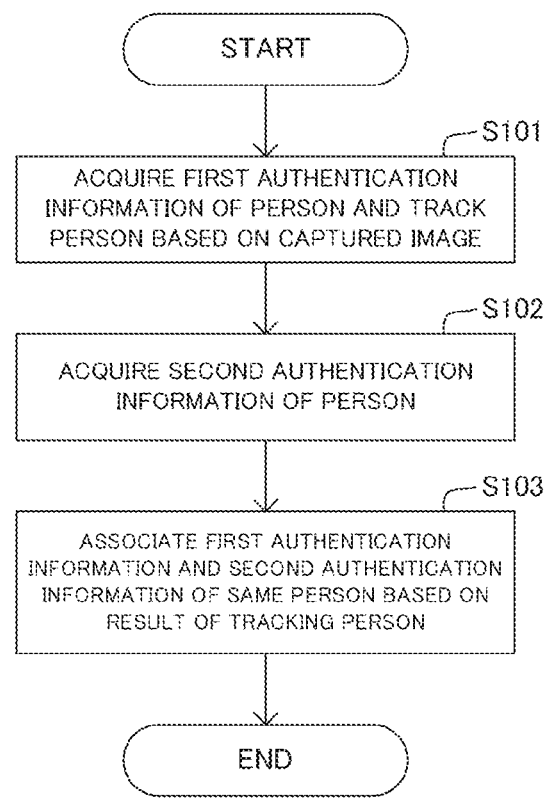
FIG. 13C is a flowchart showing an operation of the information processing device according to the third example embodiment of the present invention.

Next, a third example embodiment of the present invention will be described with reference to FIGS. 13A to 13C. FIGS. 13A and 13B are block diagrams showing the configuration of an information processing device in the third example embodiment, and FIG. 13C is a flowchart showing the operation of the information processing device. In this example embodiment, the overview of the configurations of the authentication systems described in the first and second example embodiments will be shown.

First, with reference to FIG. 13A, the hardware components of an information processing device 100 in this example embodiment will be described. The information processing device 100 is formed by a general information processing device and, as an example, includes hardware components as shown below:

- a Central Processing Unit, CPU, 101 (an arithmetic logic unit)
- a Read Only Memory, ROM, 102 (a storage unit)
- a Random Access Memory, RAM, 103 (a storage unit)
- programs 104 loaded to RAM 303
- a storage device 105 for storing programs 104
- a drive device 106 that reads from and writes onto a storage medium 110 outside the information processing device
- a communication interface 107 that connects to a communication network 111 outside the information processing device
- an input/output interface 108 that inputs/outputs data
- a bus 109 that connects the respective components.

Through the CPU 101 acquiring and executing the programs 104, the information processing device 100 can construct and include a first acquiring unit 121, a tracking unit 122, a second acquiring unit 123, and an associating unit 124 that are shown in FIG. 13B. The programs 104 are previously stored in, for example, the storage device 105 or the ROM 102, and the CPU 101 loads to the RAM 103 and executes as necessary. The programs 104 may be supplied to the CPU 101 via the communication network 111, or the programs 104 may be previously stored in the storage medium 110 and retrieved and given by the drive device 106 to CPU 101. Meanwhile, the abovementioned first acquiring unit 121, tracking unit 122, second acquiring unit 123, and associating unit 124 may be constructed by an electronic circuit.

That is, the information processing device 100 in this example embodiment includes:

the first acquiring unit 121 configured to acquire first authentication information of a person;

the tracking unit 122 configured to track a person from whom the first authentication information has been acquired, based on a captured image captured by an image capturing device;

the second acquiring unit 123 configured to acquire second authentication information of a person at a predetermined place; and the associating unit 124 configured to associate the first authentication information and the second authentication information of a same person, based on a result of tracking a person.

FIG. 13A shows an example of the hardware components of the information processing device 100, and the hardware components of the information processing device are not limited to the components described above. For example, the information processing device may include part of the components described above; for example, the information processing device may include the components except the drive device 106.

Through the functions of the first acquiring unit 121, the tracking unit 122, the second acquiring unit 123, and the associating unit 124 that are constructed by the program as described above, the information processing device 100 executes an information processing method shown in the flowchart of FIG. 13C.

As shown in FIG. 13C, the information processing device 100 of the above configuration operates so as to execute:

a first step (step S101) for acquiring first authentication information of a person, and also tracking a person from whom the first authentication information has been acquired, based on a captured image captured by an image capturing device;

a second step (step S102) for acquiring second authentication information of a person at a predetermined place; and a third step (step S103) for associating the first authentication information and the second authentication information of a same person, based on a result of tracking a person.

According to the invention, the information processing device acquires both first authentication information and second authentication information of a person and also tracks the person, thereby being able to associate the first authentication information and the second authentication information of the same person. As a result, the operation of associating authentication information including two factors is facilitated, and a two-factor authentication system can be easily used.

Fourth Example Embodiment

Next, a fourth example embodiment of the present invention will be described with reference to FIGS. 14 to 18. Although automatically registering two pieces of authentication information, such as gait data and face data, has been described in the above example embodiments, it is assumed in this example embodiment that an authentication system registers one piece of authentication information. First, a case of registering face data as one piece of authentication information will be described with reference to FIGS. 14 and 15.

Figure 14:
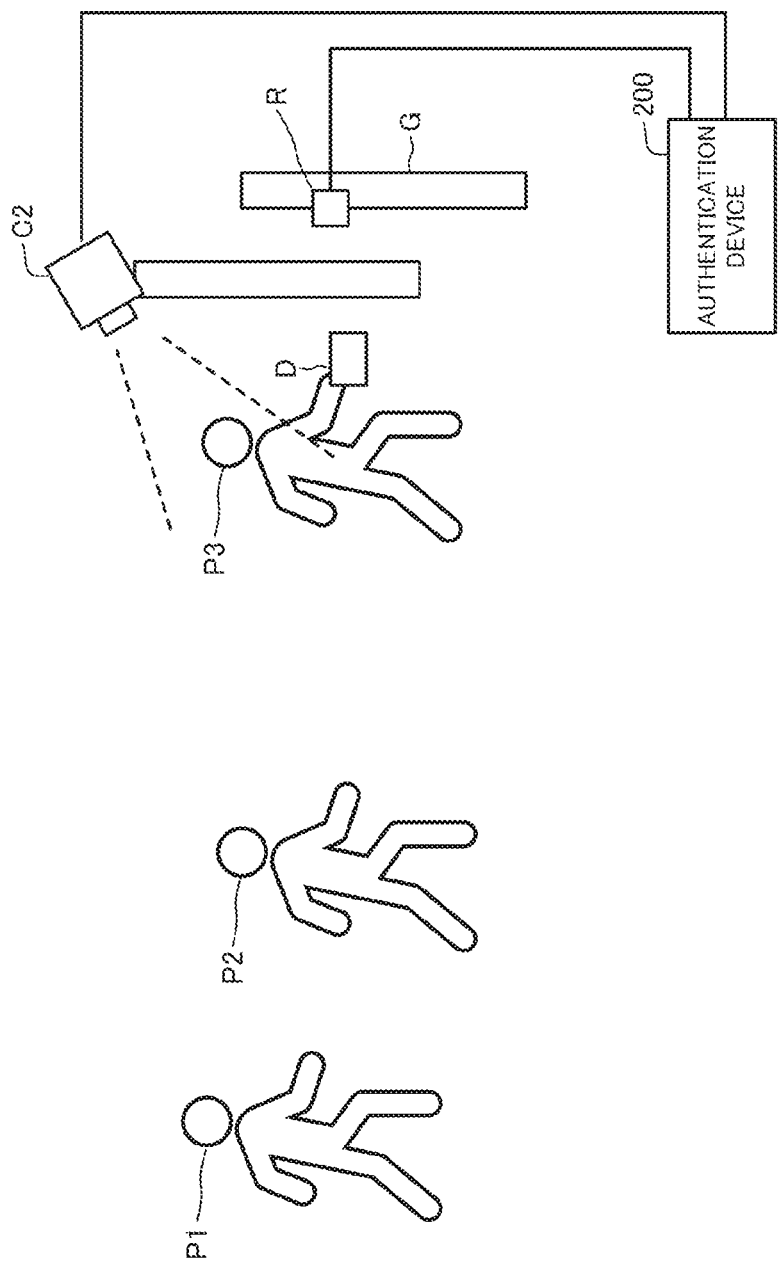
FIG. 14 is a view showing an example of an overall structure of an authentication system in a fourth example embodiment of the present invention.
Figure 15:
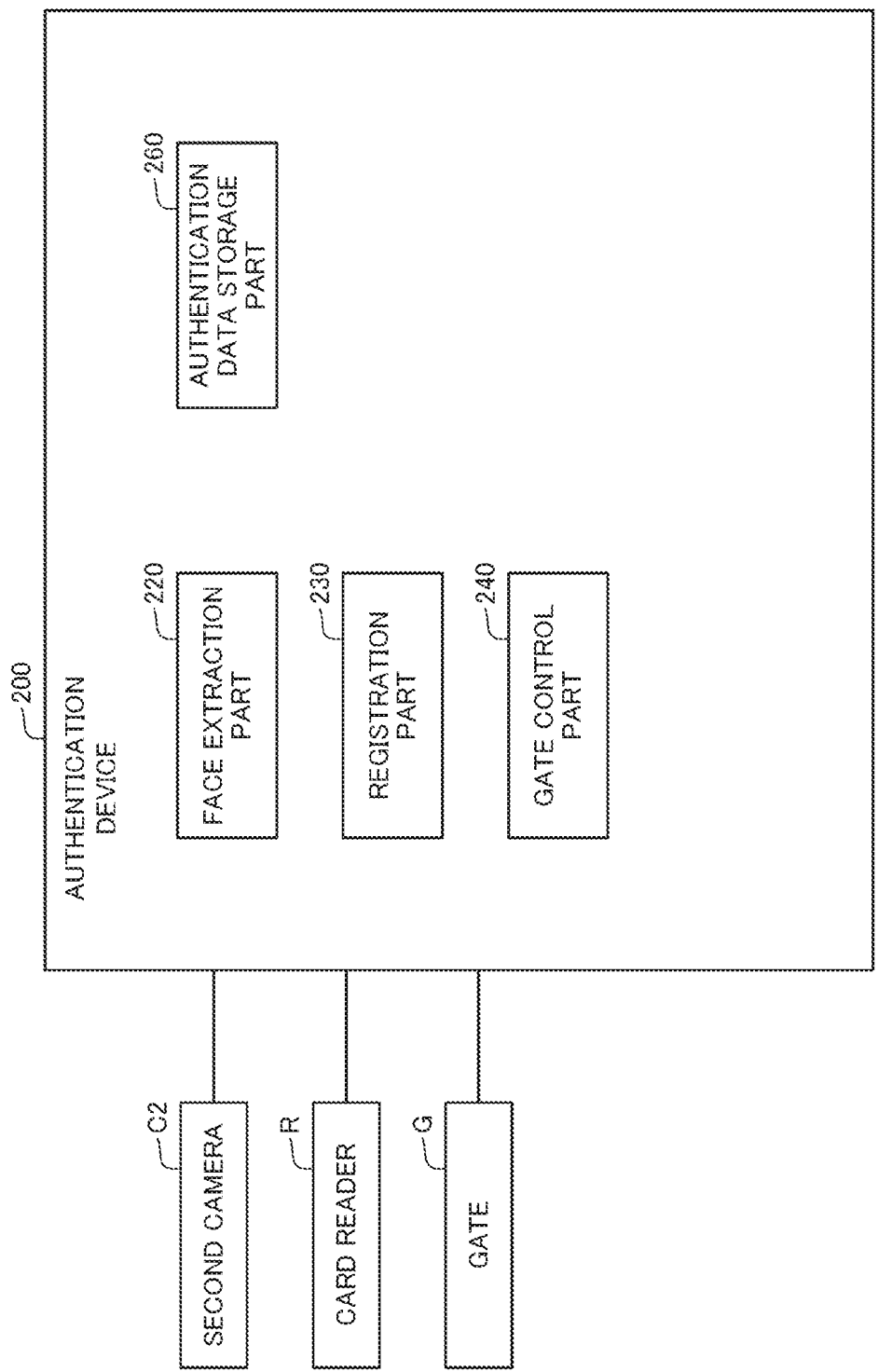
FIG. 15 is a block diagram showing a configuration of an authentication device disclosed in FIG. 14.

The authentication system in this example embodiment does not include the first camera C1 of the authentication system described in the first example embodiment and, as shown in FIG. 14, includes the second camera C2 installed at the gate G, the card reader R installed at the gate G, and an authentication device 200 that performs a person authentication process and control of opening and closing of the gate G. As shown in FIG. 15, the authentication device 200 includes a face extraction part 220, a registration part 230, and a gate control part 240 that are constructed through an arithmetic logic unit installed therein executing a program. Moreover, the authentication device 200 includes an authentication data storage part 260 formed in a storage unit installed therein. In the detailed description of the respective components below, a component different from that of the above example embodiments will be mainly described. Therefore, the authentication device 200 of this example embodiment has the same function as in the above example embodiments except described below.

The face extraction part 220 (an acquiring unit) acquires a captured image captured by the second camera C2 installed at the gate G. Then, the face extraction part 220 extracts a face image of the person P3 from the captured image, and extracts face data (authentication information) representing the feature value of a face from the extracted face image. That is, the face extraction part 220 acquires face data from the person P3 located in an area before the gate G (a predetermined place).

Further, the face extraction part 220 checks whether or not, when acquiring the face data as described above, the card reader R (a reading device) reads person identification information from the card D and the card reader R notifies the person identification information (predetermined information). In the case of being notified of the person identification information almost simultaneously with acquisition of the face data, the face extraction part 220 acquires the notified person identification information as person identification information of the person from whom the face data has been acquired, and associates the face data acquired at almost the same timing with the person identification information and transmits to the registration part 230. With this, the registration part 230 can detect that the person P3 gets located in the area before the gate G and, at this timing, performs a registration process to be described below.

On the other hand, in a case where, when the face extraction part 220 acquires the face data, the card reader R does not read person identification information and does not notify the person identification information, the face extraction part 220 proceeds to an authentication process. This is because the person has already been authenticated and registered, and therefore, does not hold the card D over the card reader R when performing the authentication process. For this reason, in the case of being not notified of person identification information almost simultaneously with acquisition of the face data, the face extraction part 220 transmits the acquired face data to the gate control part 240. By acquiring the face data, the gate control part 240 can detect that the person gets located in the area before the gate G, and performs the authentication process to be described below.

The registration part 230 (a registering unit) performs a registration process to acquire person identification information and face data transmitted from the face extraction part 220, associates them as authentication information, and register into the authentication data storage part 260. At this time, the registration part 230 performs authentication of the person identification information read from the card D and acquired almost simultaneously with the face data. In a case where the person identification information has been previously registered and the authentication has succeeded, the registration part 230 registers the face data of the person as authentication information. That is, in a case where the person identification information stored in the card D has been registered beforehand as information of a person allowed to pass through the gate G, authentication information is automatically registered through success of authentication of the person identification information.

When notified by the registration part 230 that authentication of person identification has succeeded, the gate control part 240 (a collating unit) judges that authentication of a person has succeeded. Then, the gate control part 240 controls the gate G to open and allows the person to pass through.

Further, the gate control part 240 performs the authentication process when person identification information of a person is not input from the card D and authentication information of face data is transmitted from the face extraction part 220. At this time, the gate control part 240 performs collation by checking whether or not face data corresponding to the acquired face data is registered in the authentication data storage part 260. In a case where the acquired face data is registered in the authentication data storage part 260, the gate control part 240 judges that authentication of the person has succeeded. After that, the gate control part 240 controls the gate G to open and allows the person to pass through.

As described above, in the authentication system in this example embodiment, it is possible to automatically register face data serving as authentication information of a person at the time of passage through the gate G. As a result, registration of authentication information is facilitated, and an authentication system can be easily used. In the background art, it is necessary to, regarding a person for whom authentication may be performed with even a little possibility, register authentication information beforehand in an authentication information database. Therefore, there is a problem that a lot of unnecessary authentication information is registered and the time to collate becomes long. In the authentication system in this exemplary embodiment, it is not required to perform registration of authentication information beforehand. Moreover, since unnecessary authentication information is not registered, the time to collate can be shortened. The authentication information acquired from the person in the area in front of the gate G is not limited to the face data described above, and may be other biological information such as the iris or fingerprint of the person, and may be other information that allows authentication of a person.

Further, in the above description, at the time of registration of authentication information, person identification information of a person stored in the card D is used. However, the person identification information is not necessarily used. For example, in a case where face data is acquired as described above for all persons passing through the gate G and such data is not registered as authentication information, it may be registered as person authentication information as it is.

Next, a case of registering gait data as one authentication information will be described with reference to FIGS. 16 and 17.

Figure 16:
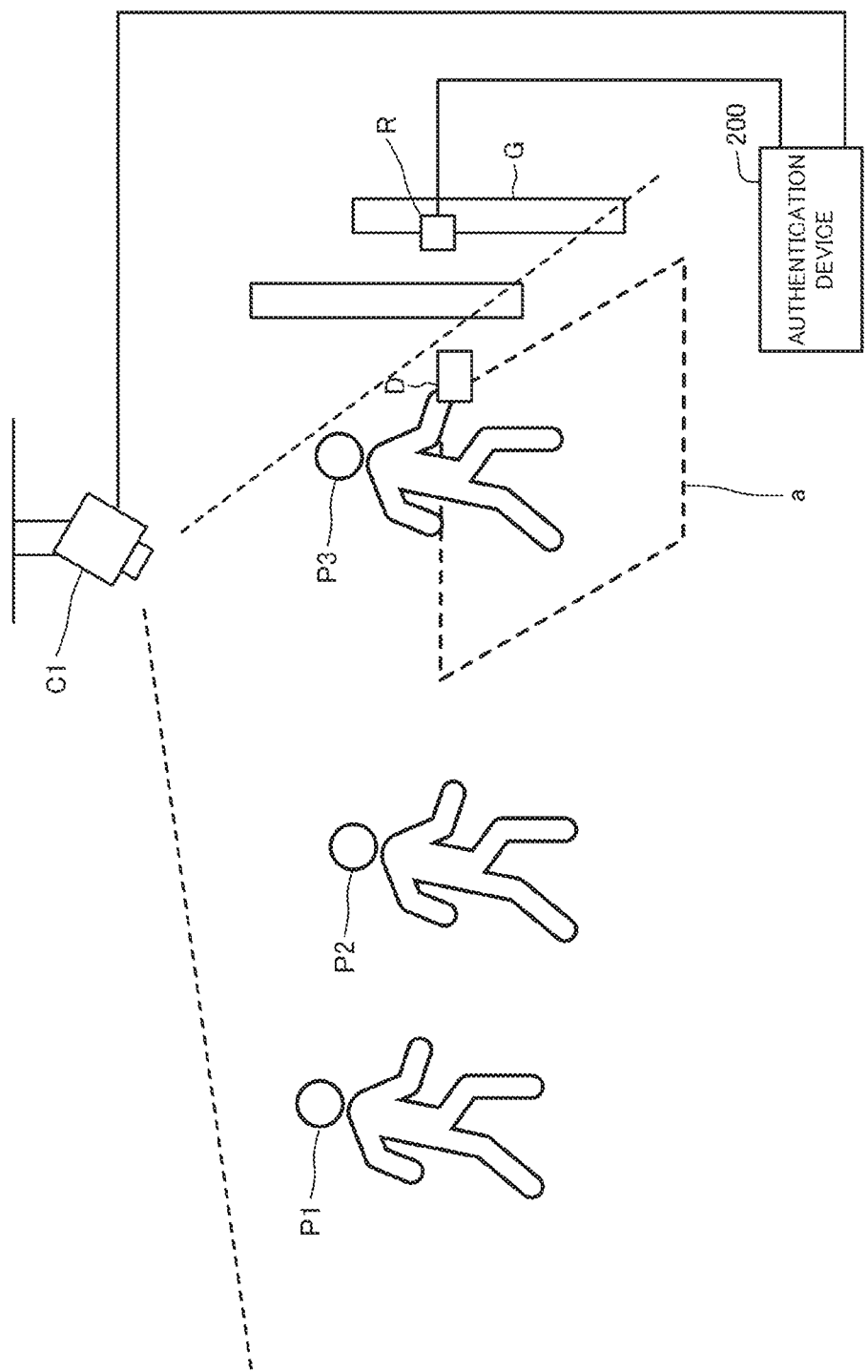
FIG. 16 is a view showing another example of the overall structure of the authentication system in the fourth example embodiment of the present invention.
Figure 17:
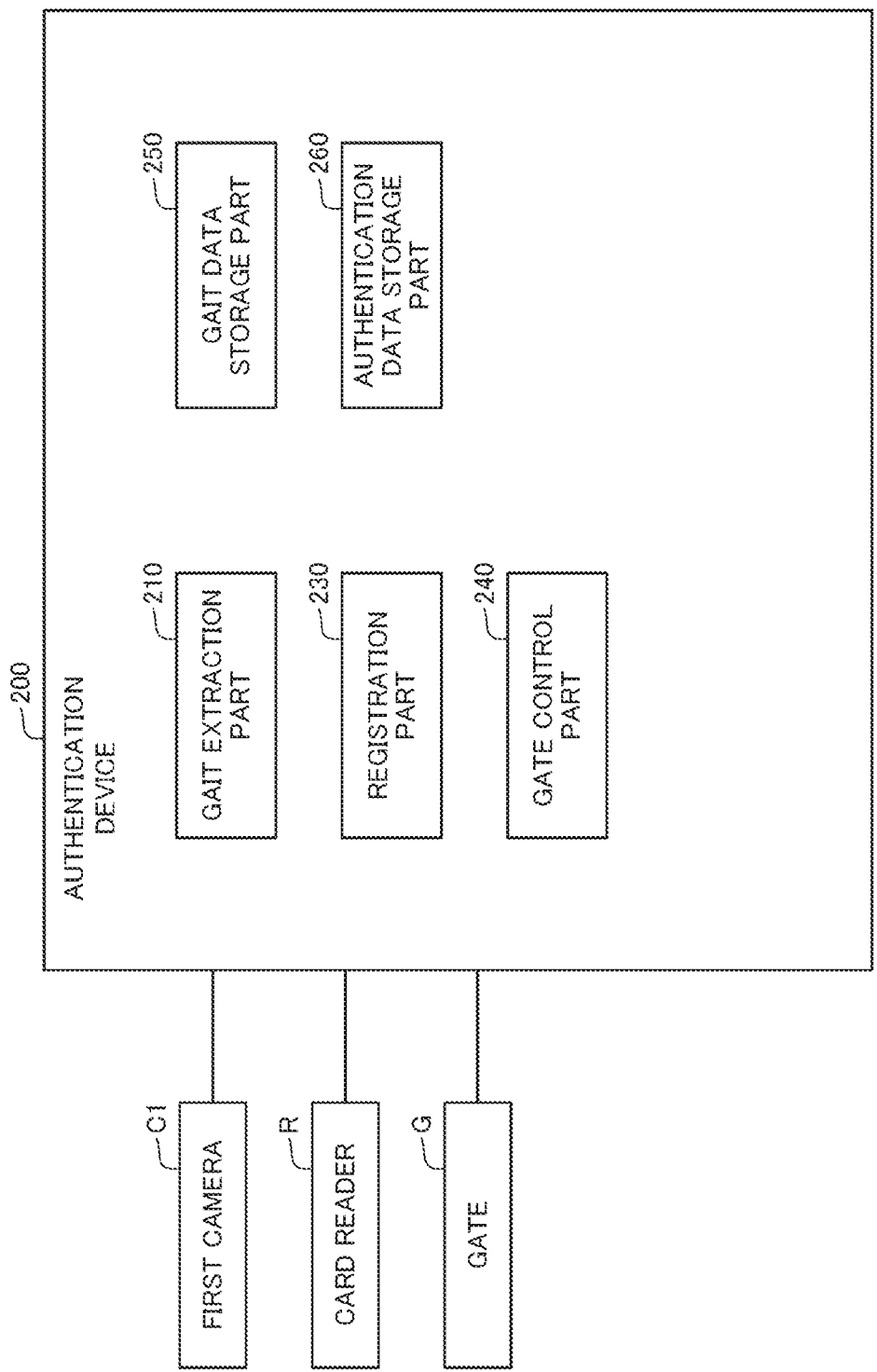
FIG. 17 is a block diagram showing a configuration of an authentication device disclosed in FIG. 16.

The authentication system in this example embodiment does not include the second camera C2 installed in the authentication system described in the first example embodiment and, as shown in FIG. 16, includes the first camera C1 that captures an image of a person heading for the gate G, the card reader R installed at the gate G, and the authentication device 200 that executes a person authentication process and control of opening and closing of the gate G. As shown in FIG. 17, the authentication device 200 includes a gait extraction part 210, the registration part 230, and the gate control part 240 that are constructed through the arithmetic logic unit installed therein executing a program. Moreover, the authentication device 200 includes a gait data storage part 250 and an authentication data storage part 260 that are formed in the storage unit installed therein. In the detailed description of the respective components below, a component different from that of the above example embodiments will be mainly described. Therefore, the authentication device 200 has the same function as in the above example embodiments except described below.

The first camera C1 is an image capturing device for capturing an image of the walking motions of the persons P1, P2, and P3 walking toward the gate G as in the first example embodiment. At this time, an image capturing range of the first camera C1 includes an area-before-gate a (a predetermined place) located immediately before the gate G. The area-before-gate a is equivalent to the face authentication area A in the first example embodiment.

The gait extraction part 210 (an acquiring unit, a tracking unit) acquires a captured image captured by the first camera C1 described above. Then, the gait extraction part 210 extracts the persons P1, P2, and P3 who are within the captured image, and extracts gait data (authentication information) representing the features of the walking motions of the persons P1, P2, and P3. Moreover, the gait extraction part 210 tracks the extracted persons P1, P2, and P3 within the captured image, assigns identification information to each of the persons P1, P2, and P3, associates the identification information with the gait data extracted from the same person, and stores into the gait data storage part 250.

Further, the gait extraction part 210 checks whether or not the persons P1, P2, and P3 tracked within the captured image are located in the area-before-gate a and, when detecting that the person gets located in the area-before-gate a, checks whether or not person identification information has been read from the card D at the card reader R and the person identification information has been notified by the card reader R. In a case where the person identification information has been notified almost simultaneously with detection of the person located in the area-before-gate a, the gait extraction part 210 acquires the notified person identification information as person identification information of the person from whom the gait data has been acquired, associates the gait data with the person identification information, and transmits to the registration part 230. Thus, the registration part 230 can detect that the person P3 gets located in the area before the gate G by acquiring the result of tracking the person and the person identification information, and performs a registration process to be described below at this timing.

On the other hand, in a case where, when the gait extraction part 210 detects that the person gets located in the area-before-gate a, the person identification information is not read at the card reader R and the person identification information is not notified, the gait extraction part 210 proceeds to an authentication process. This is because the person has already been authenticated and registered and does not hold the card D over the card reader R at the time of the authentication process. Therefore, in a case where, when the gait extraction part detects that the person gets located in the area-before-gate a, the person identification information is not notified, the gait extraction part 210 transmits gait data of the person located in the area-before-gate a to the gate control part 240. The gate control part 240 can detect that the person gets located in the area-before-gate a by acquiring the gait data, and performs the authentication process to be described below.

The registration part 230 (a registering unit) performs a registration process of acquiring person identification information and gait data transmitted from the gait extraction part 210 and associating them as authentication information of the same person to register into the authentication data storage part 260. At this time, the registration part 230 performs authentication of the person identification information read from the card D acquired together with the gait data. In a case where the person identification information has been registered beforehand and the authentication has succeeded, the registration part 230 registers the gait data of the person as authentication information. That is, in a case where the person identification information stored in the card D has been registered as information of a person allowed to pass through the gate G beforehand, authentication of the person identification information succeeds, and authentication information is thereby registered automatically.

When receiving notification that authentication of the person identification information has succeeded from the registration part 230, the gate control part 240 (a collating unit) judges that authentication of the person has succeeded. Then, the gate control part 240 controls the gate G to open and allows the person to pass through.

Further, in a case where person identification information of a person has not been input from the card D and authentication information such as gait data is transmitted from the gait extraction part 210, the gate control part 240 performs the authentication process. At this time, the gate control part 240 performs collation by checking whether or not gait data corresponding to the acquired gait data is registered in the authentication data storage part 260. Then, in a case where the acquired gait data is registered in the authentication data storage part 260, the gate control part 240 judges that the person is successfully authenticated. After that, the gate control part 240 controls the gate G to open and allows the person to pass through.

As described above, in the authentication system in this example embodiment, it is possible to automatically register gait data serving as authentication information of a person when the person passes through the gate G. As a result, registration of authentication information is facilitated, and the authentication system can be used with ease. In the background art, it is necessary to, regarding a person for whom authentication may be performed with even a little possibility, register authentication information beforehand in an authentication information database. Therefore, there is a problem that a lot of unnecessary authentication information is registered and the time to collate becomes long. In the authentication system in this exemplary embodiment, it is not required to perform registration of authentication information beforehand. Moreover, since unnecessary authentication information is not registered, it is possible to shorten the time to collate. The authentication information acquired from the person is not limited to the gait data described above, and may be information representing the feature of another motion of a person, and may be information representing the feature of the outline like body shape of a person.

Further, in the above description, person identification information of a person stored in the card D is used at the time of registration of authentication information. However, the person identification information does not need to be used necessarily. For example, in a case where gait data of a person detected to be located in the area-before-gate a as a result of tracking the person is not registered as authentication information, it may be registered as authentication information of the person as it is.

Figure 18:
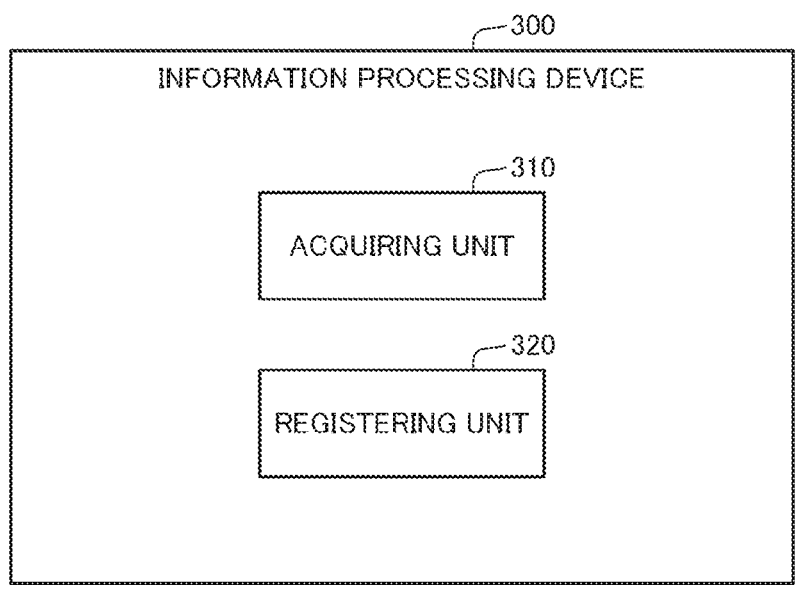
FIG. 18 is a block diagram showing a configuration of an information processing device according to the fourth example embodiment of the present invention.

The authentication system in this example embodiment described above may be configured as shown in FIG. 18. FIG. 18 is a block diagram showing the configuration of an information processing device, and shows the overview of the configuration of an authentication system in this example embodiment.

As shown in FIG. 18, an information processing device 300 in this example embodiment includes:
an acquiring unit 310 configured to acquire authentication information of a person; and
a registering unit 320 configured to, when detecting that a person gets located in a predetermined place, register authentication information of the person.

The acquiring unit 310 and the registering unit 320 may be constructed by an arithmetic logic unit included by the information processing device 300 executing a program, or may be constructed by an electronic circuit.

The information processing device 300 of the above configuration operates so as to execute a process of:
acquiring authentication information of a person; and
when detecting that a person gets located in a predetermined place, registering authentication information of the person.

According to the invention, the information processing device can automatically register authentication information of a person. As a result, registration of authentication information is facilitated, and the authentication system can be used with ease.

<Supplementary Notes>

The whole or part of the example embodiments disclosed above can be described as the following supplementary notes. The overview of the configurations of an information processing device, a non-transitory computer-readable medium storing a program, and an information processing method according to the present invention will be described below. However, the present invention is not limited to the following configurations.

(Supplementary Note 1)

An information processing device comprising:

a first acquiring unit configured to acquire first authentication information of a person;

a tracking unit configured to track a person from whom the first authentication information has been acquired, based on a captured image captured by an image capturing device;

a second acquiring unit configured to acquire second authentication information of a person in a predetermined place; and an associating unit configured to associate the first authentication information and the second authentication information of a same person, based on a result of tracking a person.

(Supplementary Note 2)

The information processing device according to Supplementary Note 1, wherein:

the first acquiring unit is configured to, based on the captured image, acquire the first authentication information of a person shown in the captured image;

the tracking unit is configured to track movement up to the predetermined place of a person from whom the first authentication information has been acquired;

the second acquiring unit is configured to acquire the second authentication information of a person from an acquisition device installed in the predetermined place; and the associating unit is configured to associate the first authentication information of a person tracked up to the predetermined place and the second authentication information of a person located in the predetermined place, based on a result of tracking a person.

(Supplementary Note 3)

The information processing device according to Supplementary Note 2, wherein:

the tracking unit is configured to detect that a person from whom the first authentication information has been acquired is located in the predetermined place; and the associating unit is configured to associate the second authentication information of a person acquired when the person gets located in the predetermined place and the already acquired first authentication information of a person tracked up to the predetermined place.

(Supplementary Note 4)

The information processing device according to any of Supplementary Notes 1 to 3, wherein:

the first acquiring unit is configured to, based on the captured image, acquire information representing a feature of a moving behavior of a person as the first authentication information; and the second acquiring unit is configured to acquire biological information of a person as the second authentication information by the acquisition device installed in the predetermined place.

(Supplementary Note 5)

The information processing device according to Supplementary Note 4, wherein:

the first acquiring unit is configured to acquire information representing a feature of a walking behavior of a person when the person moves to the predetermined place, as the first authentication information; and the second acquiring unit is configured to acquire a face feature value extracted from a face image of a person captured by the acquisition device installed in the predetermined place, as the second authentication information.

(Supplementary Note 6)

The information processing device according to any of Supplementary Notes 1 to 5, further comprising a collating unit configured to, based on a result of tracking a person, collate the first authentication information and the second authentication information acquired from a same person with the first authentication information and the second authentication information that are already associated.

(Supplementary Note 7)

The information processing device according to Supplementary Note 6, wherein the collating unit is configured to, based on a result of tracking a person, collate the first authentication information of a person tracked up to the predetermined place and the second authentication information of a person located in the predetermined place with the first authentication information and the second authentication information that are already associated.

(Supplementary Note 8)

The information processing device according to Supplementary Note 7, wherein the collating unit is configured to collate the second authentication information of a person acquired when the person gets located in the predetermined place and the already acquired first authentication information of a person tracked up to the predetermined place with the first authentication information and the second authentication information that are already associated.

(Supplementary Note 9)

The information processing device according to any of Supplementary Notes 6 to 8, wherein the associating unit is configured to, in a case where, as a result of collation on a person located in the predetermined place, collation of the first authentication information has failed and collation of the second authentication information has succeeded, newly associate the first authentication information of a person tracked up to the predetermined place with the second authentication information.

(Supplementary Note 10)

A non-transitory computer-readable medium storing a program comprising instructions for causing an information processing device to realize:

a first acquiring unit configured to acquire first authentication information of a person;

a tracking unit configured to track a person from whom the first authentication information has been acquired, based on a captured image captured by an image capturing device;

a second acquiring unit configured to acquire second authentication information of a person in a predetermined place; and an associating unit configured to associate the first authentication information and the second authentication information of a same person, based on a result of tracking a person.

(Supplementary Note 10.1)

The non-transitory computer-readable medium storing the program according to Supplementary Note 10, the program comprising instructions for causing the information processing device to further realize:

a collating unit configured to, based on a result of tracking a person, collate the first authentication information and the second authentication information acquired from a same person with the first authentication information and the second authentication information that are already associated.

(Supplementary Note 11)

An information processing method comprising:

a first process to acquire first authentication information of a person, and track a person from whom the first authentication information has been acquired, based on a captured image captured by an image capturing device;

a second process to acquire second authentication information of a person in a predetermined place; and a third process to associate the first authentication information and the second authentication information of a same person, based on a result of tracking a person.

(Supplementary Note 11.1)

The information processing method according to Supplementary Note 11, wherein:

the first process is to, based on the captured image, acquire the first authentication information of a person shown in the captured image, and track movement up to the predetermined place of a person from whom the first authentication information has been acquired;

the second process is to acquire the second authentication information of a person from an acquisition device installed in the predetermined place; and the third process is to associate the first authentication information of a person tracked up to the predetermined place and the second authentication information of a person located in the predetermined place, based on a result of tracking a person.

(Supplementary Note 11.2)

The information processing method according to Supplementary Note 11.1, wherein:

the first process is to detect that a person from whom the first authentication information has been acquired is located in the predetermined place; and the third process is to associate the second authentication information of a person acquired when the person gets located in the predetermined place and the already acquired first authentication information of a person tracked up to the predetermined place.

(Supplementary Note 11.3)

The information processing method according to any of Supplementary Notes 11 to 11.2, wherein:

the first process is to, based on the captured image, acquire information representing a feature of a moving behavior of a person as the first authentication information; and the second process is to acquire biological information of a person as the second authentication information by the acquisition device installed in the predetermined place.

(Supplementary Note 11.4)

The information processing method according to Supplementary Note 11.3, wherein: the first process is to acquire information representing a feature of a walking behavior of a person when the person moves to the predetermined place, as the first authentication information; and the second process is to acquire a face feature value extracted from a face image of a person captured by the acquisition device installed in the predetermined place, as the second authentication information.

(Supplementary Note 12)

The information processing method according to any of Supplementary Notes 11 to 11.4, further comprising, after the third process:

a fourth process to acquire the first authentication information of a person, and track a person from whom the first authentication information has been acquired, based on a captured image captured by an image capturing device;

a fifth process to acquire the second authentication information of a person in a predetermined place; and a sixth process to, based on a result of tracking a person, collate the first authentication information and the second authentication information acquired from a same person with the first authentication information and the second authentication information that are already associated.

(Supplementary Note 12.1)

The information processing method according to Supplementary Note 12, wherein the sixth process is to, based on a result of tracking a person, collate the first authentication information of a person tracked up to the predetermined place and the second authentication information of a person located in the predetermined place with the first authentication information and the second authentication information that are already associated.

(Supplementary Note 12.2)

The information processing method according to Supplementary Note 12.1, wherein the sixth process is to collate the second authentication information of a person acquired when the person gets located in the predetermined place and the already acquired first authentication information of a person tracked up to the predetermined place with the first authentication information and the second authentication information that are already associated.

(Supplementary Note 13)

The information processing method according to any of Supplementary Notes 12 to 12.2, wherein the sixth process is to, in a case where, as a result of collation on a person located in the predetermined place, collation of the first authentication information has failed and collation of the second authentication information has succeeded, newly associate the first authentication information of a person tracked up to the predetermined place with the second authentication information.

(Supplementary Note 2-1)

An information processing device comprising:

an acquiring unit configured to acquire authentication information of a person; and a registering unit configured to, when detecting that a person gets located in a predetermined place, register authentication information of the person.

(Supplementary Note 2-2)

The information processing device according to Supplementary Note 2-1, wherein the registering unit is configured to, by receiving an input of predetermined information from a person located in the predetermined place, detect that the person is located in the predetermined place and register the authentication information of the person.

(Supplementary Note 2-3)

The information processing device according to Supplementary Note 2-2, wherein the registering unit is configured to, when receiving an input of the predetermined information from a person through a reading device installed in the predetermined place, detect that the person is located in the predetermined place and register the authentication information of the person.

(Supplementary Note 2-4)

The information processing device according to Supplementary Note 2-3, wherein the registering unit is configured to perform authentication of the predetermined information when receiving an input of the predetermined information from a person through the reading device installed in the predetermined place and register the authentication information of the person when the authentication of the predetermined information has succeeded.

(Supplementary Note 2-5)

The information processing device according to any of Supplementary Notes 2-1 to 2-4, wherein the acquiring unit is configured to acquire the authentication information of a person from an acquisition device installed in the predetermined place.

(Supplementary Note 2-6)

The information processing device according to Supplementary Note 2-5, wherein the acquiring unit is configured to acquire biological information of a person from the acquisition device installed in the predetermined place as the authentication information.

(Supplementary Note 2-7)

The information processing device according to any of Supplementary Notes 2-1 to 2-4, further comprising a tracking unit configured to track a person from whom the authentication information has been acquired, based on a captured image captured by an image capturing device, wherein the registering unit is configured to register the authentication information of a person based on a result of tracking the person.

(Supplementary Note 2-8)

The information processing device according to Supplementary Note 2-7, wherein:

the acquiring unit is configured to acquire the authentication information of a person shown in the captured image based on the captured image; and the tracking unit is configured to track movement up to the predetermined place of a person from whom the authentication information has been acquired.

(Supplementary Note 2-9)

The information processing device according to Supplementary Note 2-7 or 2-8, wherein the acquiring unit is configured to acquire information representing a feature of a walking behavior of a person when the person moves to the predetermined place, as the authentication information.

(Supplementary Note 2-10)

The information processing device according to any of Supplementary Notes 2-1 to 2-9, further comprising a collating unit configured to collate the authentication information acquired from a person located in the predetermined place with the registered authentication information.

(Supplementary Note 2-11)

An information processing method comprising:

acquiring authentication information of a person; and when detecting that a person gets located in a predetermined place, registering the authentication information of the person.

(Supplementary Note 2-12)

The information processing method according to Supplementary Note 2-11, wherein, by receiving an input of predetermined information from a person located in the predetermined place, it is detected that the person is located in the predetermined place, and the authentication information of the person is registered.

(Supplementary Note 2-13)

The information processing method according to Supplementary Note 2-11 or 2-12, wherein the authentication information of a person is acquired from an acquisition device installed in the predetermined place.

(Supplementary Note 2-14)

The information processing method according to Supplementary Note 2-11 or 2-12, further comprising:

tracking a person from whom the authentication information has been acquired, based on a captured image captured by an image capturing device; and registering the authentication information of a person based on a result of tracking the person.

(Supplementary Note 2-15)

The information processing method according to Supplementary Note 2-14, wherein:

the authentication information of a person shown in the captured image is acquired based on the captured image;

movement up to the predetermined place of a person from whom the authentication information has been acquired is tracked; and the authentication information of a person is registered based on a result of tracking the person.

(Supplementary Note 2-16)

The information processing method according to any of Supplementary Notes 2-11 to 2-15, further comprising collating the authentication information acquired from a person located in the predetermined place with the registered authentication information.

(Supplementary Note 2-17)

A non-transitory computer-readable medium storing a program comprising instructions for causing an information processing device to realize:

an acquiring unit configured to acquire authentication information of a person; and a registering unit configured to, when detecting that a person gets located in a predetermined place, register authentication information of the person.

Meanwhile, the abovementioned program may be stored in various types of non-transitory computer-readable mediums and supplied to the computer. The non-transitory computer-readable mediums include various types of tangible storage mediums. The non-transitory computer-readable mediums include, for example, a magnetic recording medium (e.g., a flexible disk, a magnetic tape, a hard disk drive), a magneto-optical recording medium (e.g., a magneto-optical disk), a CD-ROM (Read Only Memory), a CD-R, a CD-R/W, a semiconductor memory (e.g., a mask ROM, PROM (Programmable ROM), an EPROM (Erasable PROM), a flash ROM, and a RAM (Random Access Memory). Moreover, the program may be supplied to the computer by various types of transitory computer-readable mediums. The transitory computer-readable mediums include, for example, an electric signal, an optical signal, and an electromagnetic signal. The transitory computer-readable medium can provide the computer with the program via a wired communication path such as an electric wire and an optical fiber, or via a wireless communication path.

While the present invention has been described above with reference to the example embodiments thereof, the present invention is not limited to these example embodiments. The forms and details of the present invention may be changed in various manners that can be understood by those skilled in the art without departing from the spirit and scope of the present invention.

LIST OF REFERENCE SYMBOLS 10 authentication device
11 gait extraction part
12 face extraction part
13 registration part
14 gait control part
15 gait data storage part
16 authentication data storage part
100 information processing device
110 first acquiring unit 120 tracking unit
130 second acquiring unit
140 associating unit
200 authentication device
210 gait extraction part
220 face extraction part
230 registration part
240 gate control part
250 gait data storage part
260 authentication data storage part
300 information processing device
310 acquiring unit
320 registering unit
A, A' face authentication area
C1 first camera
C2 second camera
D card
G gate
G' cash register
P1, P2, P3 person
R card reader

The invention claimed is:

1. An information processing device comprising:
at least one memory storing instructions and at least one processor coupled to the at least one memory, wherein the at least one processor executes the instructions to:
acquire first authentication information of a person by a first acquisition device, wherein the first authentication information includes a walking behavior of the person as the person moves to a predetermined place, and the first authentication information is acquired by tracking the person up to the predetermined place;
acquire second authentication information of the person by a second acquisition device, wherein the second authentication information includes a face feature extracted from a face image of the person captured by the first acquisition device, wherein the first acquisition device is installed in the predetermined place;
associate the first authentication information of the person and the second authentication information of the person based on a position of the person in a captured image; and
collate the first authentication information and the second authentication information.

2. The information processing device according to claim 1, wherein the at least one processor executes the instructions to, in a case where, as a result of collation on the person located in the predetermined place, collation of the first authentication information has failed and collation of the second authentication information has succeeded, newly associate the first authentication information of the person tracked up to the predetermined place with the second authentication information.

3. A non-transitory computer-readable medium storing a program comprising instructions for causing at least one processor included by an information processing device to realize execution of processes to:
acquire first authentication information of a person by a first acquisition device, wherein the first authentication information includes a walking behavior of the person as the person moves to a predetermined place, and the first authentication information is acquired by tracking the person up to the predetermined place;
acquire second authentication information of the person by a second acquisition device, wherein the second authentication information includes a face feature extracted from a face image of the person captured by the first acquisition device, wherein the first acquisition device is installed in the predetermined place;
associate the first authentication information of the person and the second authentication information of the person based on a position of the person in a captured image; and
collate the first authentication information and the second authentication information.

4. An information processing method executed by at least one processor included by an information processing device, wherein the at least one processor executes processes to:
acquire first authentication information of a person by a first acquisition device, wherein the first authentication information includes a walking behavior of the person as the person moves to a predetermined place, and the first authentication information is acquired by tracking the person up to the predetermined place;
acquire second authentication information of the person by a second acquisition device, wherein the second authentication information includes a face feature extracted from a face image of the person captured by the first acquisition device, wherein the first acquisition device is installed in the predetermined place;
associate the first authentication information of the person and the second authentication information of the person based on a position of the person in a captured image; and
collate the first authentication information and the second authentication information.

5. The information processing method according to claim 4, wherein the at least one processor executes processes to, in a case where, as a result of collation on the person located in the predetermined place, collation of the first authentication information has failed and collation of the second authentication information has succeeded, newly associate the first authentication information of the person tracked up to the predetermined place with the second authentication information.

* * * * *